(12) United States Patent
Kinoshita et al.

(10) Patent No.: US 9,134,972 B2
(45) Date of Patent: Sep. 15, 2015

(54) USER INTERFACE GENERATION APPARATUS

(75) Inventors: Kenta Kinoshita, Yokohama (JP); Kazuhiro Yamamoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 84 days.

(21) Appl. No.: 12/935,709

(22) PCT Filed: Mar. 26, 2009

(86) PCT No.: PCT/JP2009/056203
§ 371 (c)(1),
(2), (4) Date: Sep. 30, 2010

(87) PCT Pub. No.: WO2009/123030
PCT Pub. Date: Oct. 8, 2009

(65) Prior Publication Data
US 2011/0035688 A1 Feb. 10, 2011

(30) Foreign Application Priority Data

Apr. 2, 2008 (JP) .................................. 2008-096604
May 29, 2008 (JP) .................................. 2008-141257

(51) Int. Cl.
G06F 3/048 (2013.01)
G06F 9/44 (2006.01)
G06F 3/0481 (2013.01)

(52) U.S. Cl.
CPC ................ G06F 8/38 (2013.01); G06F 3/0481 (2013.01)

(58) Field of Classification Search
CPC .................................. G06F 8/34; G06F 3/048
USPC .......................................................... 715/763
See application file for complete search history.

(56) References Cited

U.S. PATENT DOCUMENTS

| 6,211,870 | B1 | 4/2001 | Foster | |
|---|---|---|---|---|
| 2004/0230905 | A1* | 11/2004 | Asakawa et al. | 715/517 |
| 2007/0038954 | A1* | 2/2007 | Ozaki | 715/788 |

(Continued)

FOREIGN PATENT DOCUMENTS

| JP | A-2001-036652 | 2/2001 |
|---|---|---|
| JP | A-2002-278666 | 9/2002 |

(Continued)

OTHER PUBLICATIONS

Jan. 17, 2012 Office Action issued in Korean Patent Application No. 10-2010-7022084 (with translation).

(Continued)

*Primary Examiner* — Sara England
*Assistant Examiner* — Angie Badawi
(74) *Attorney, Agent, or Firm* — Oliff PLC

(57) ABSTRACT

A user interface generation device includes: a generation unit which generates a user interface for instructing an execution unit to execute a function based on an application program; and a storage unit which stores a definition file defining a user interface object and information indicating a display ability of a display unit. The generation unit selects or discards the object definition information and judges whether all the objects can be displayed. If No, the generation unit rewrites the information relating to the object size according to the information in the display unit so that all the objects can be displayed. After this, the generation unit generates a synthesis user interface according to the information.

16 Claims, 26 Drawing Sheets

(56) References Cited

U.S. PATENT DOCUMENTS

2007/0101297 A1* 5/2007 Forstall et al. ............... 715/841
2007/0242056 A1* 10/2007 Engelhardt et al. ........... 345/173
2009/0239587 A1* 9/2009 Negron et al. ................ 455/566

FOREIGN PATENT DOCUMENTS

JP   A-2006-085218   3/2006
JP   A-2007-012037   1/2007

OTHER PUBLICATIONS

International Search Report in International Application No. PCT/JP2009/056203; dated Apr. 28, 2009 (with English-language translation).

Sep. 28, 2012 Office Action issued in Korean Patent Application No. 10-2010-7022084 (with translation).

Jun. 19, 2014 Office Action issued in U.S. Appl. No. 12/935,376.

Shelley O'Hara et al., "Absolute Beginner's Guide to Microsoft Windows Vista," chapter 1, 8 pages, dated Dec. 29, 2006.

Dec. 4, 2014 Office Action issued in U.S. Appl. No. 12/935,376.

Watson; "Desktop shell demo;" 2007; 4 pages.

Microsoft Press; "Microsoft windows user experience;" 1999; pp. 242-243.

Jan. 29, 2013 Office Action issued in Japanese Patent Application No. 2010-505810 (with translation).

Plus2Net, "Counting the characters dynamically inside a textarea and setting a limit," Feb. 10, 2007, 2 pages ("Plus2Net").

May 28, 2015 Office Action issued in U.S. Appl. No. 12/935,376.

* cited by examiner

FIG. 5
(A) 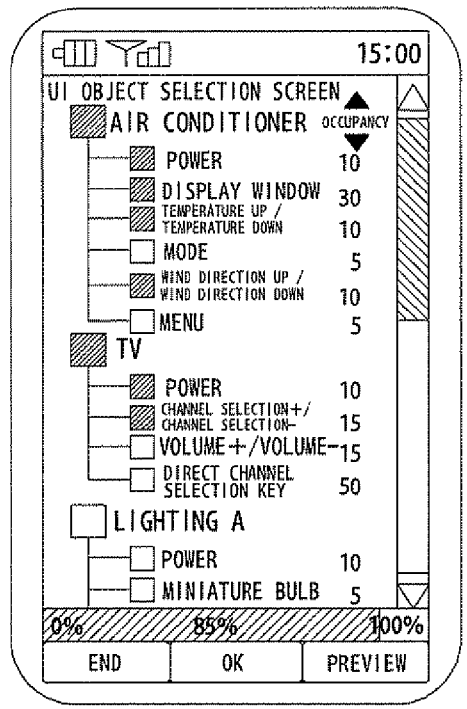
(B) 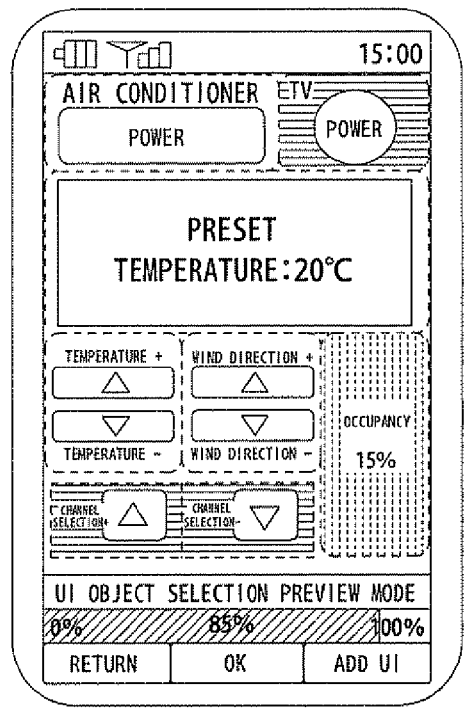
(C) 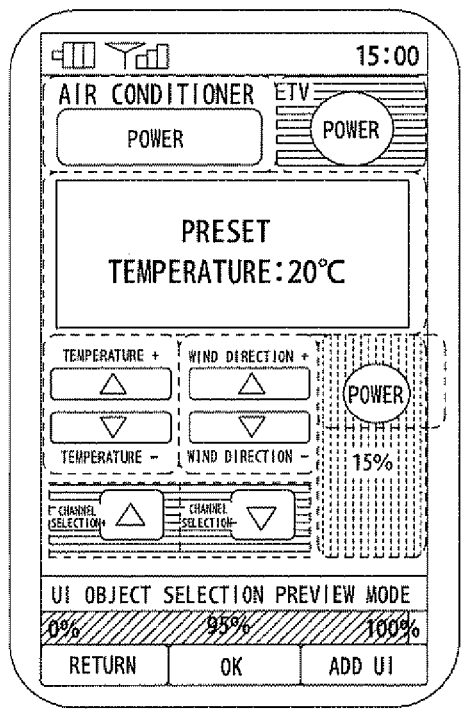
(D) 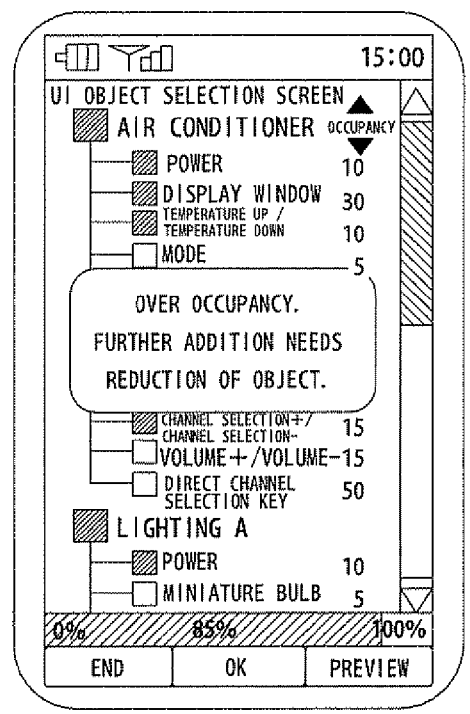

FIG. 6
(A) 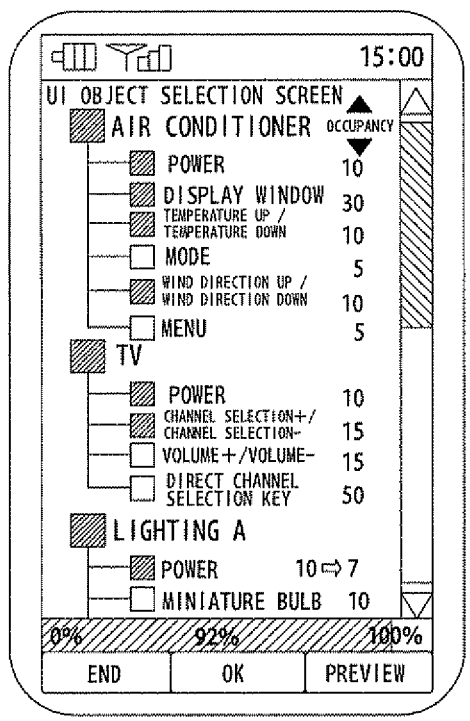
(B) 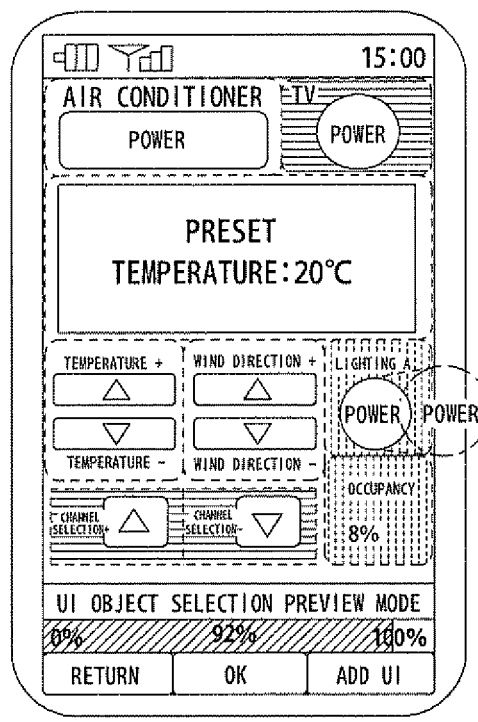
(C) 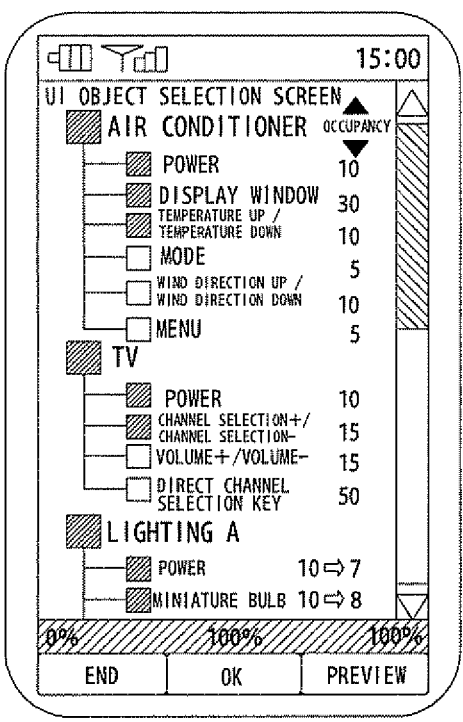
(D) 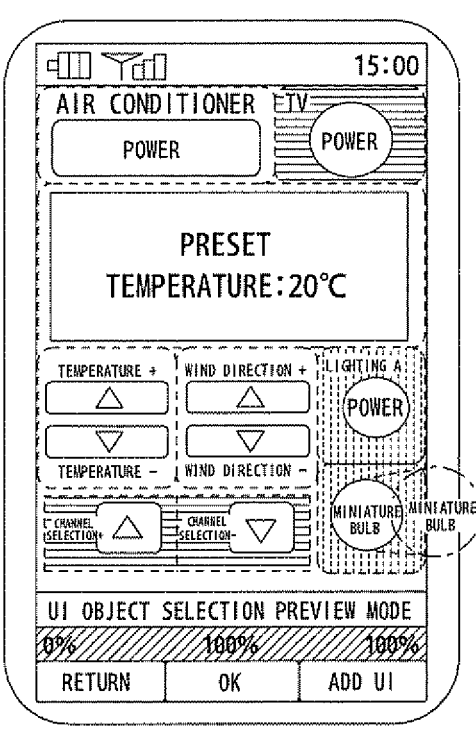

FIG. 7
(A) 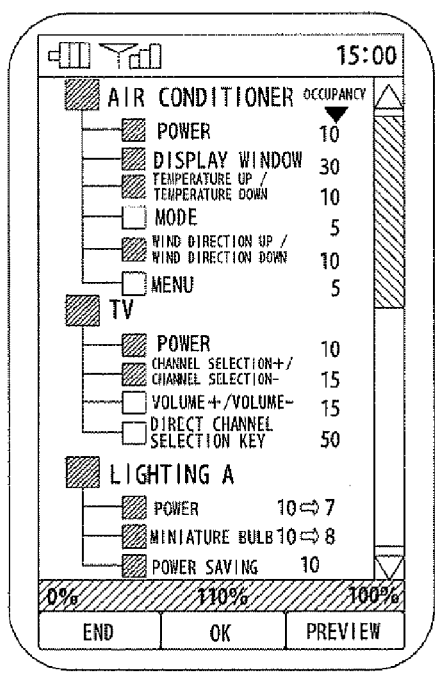
(B) 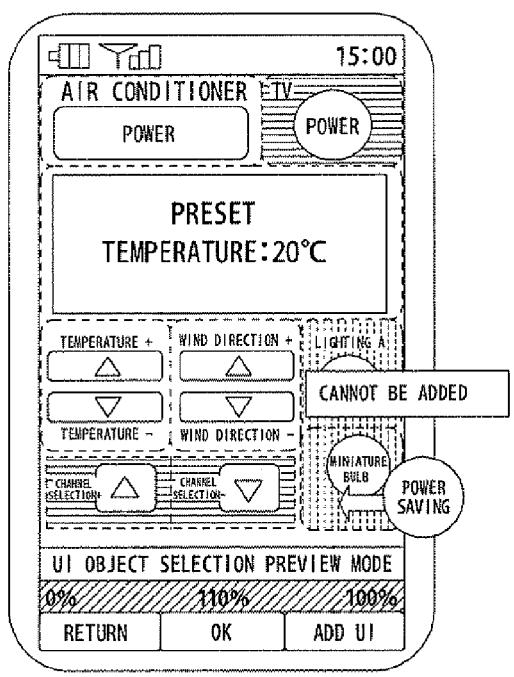
(C) 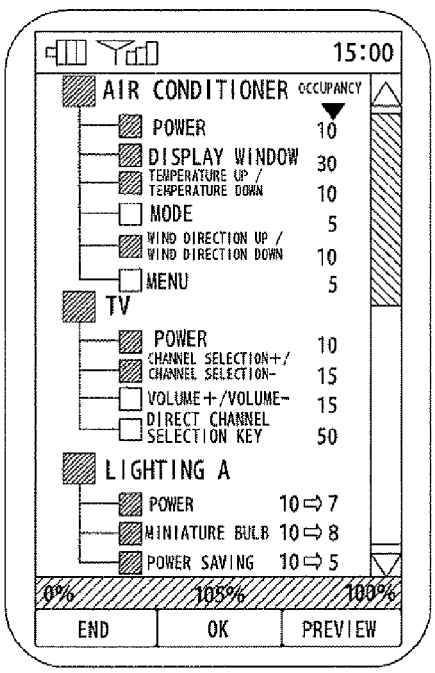
(D) 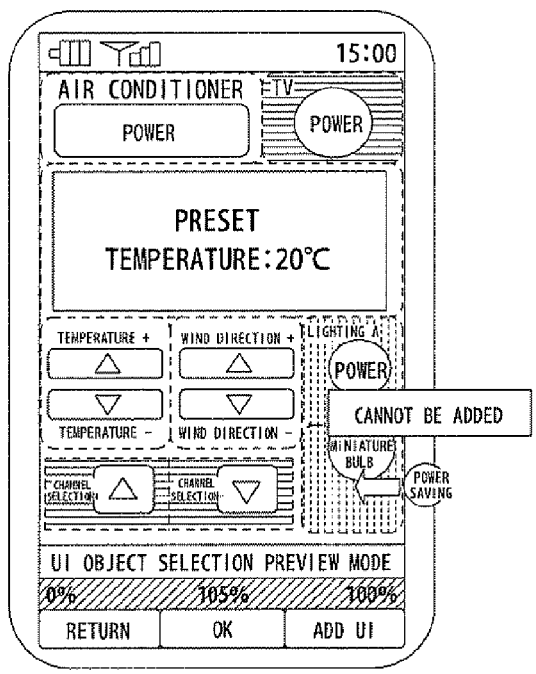

FIG. 8
(A) 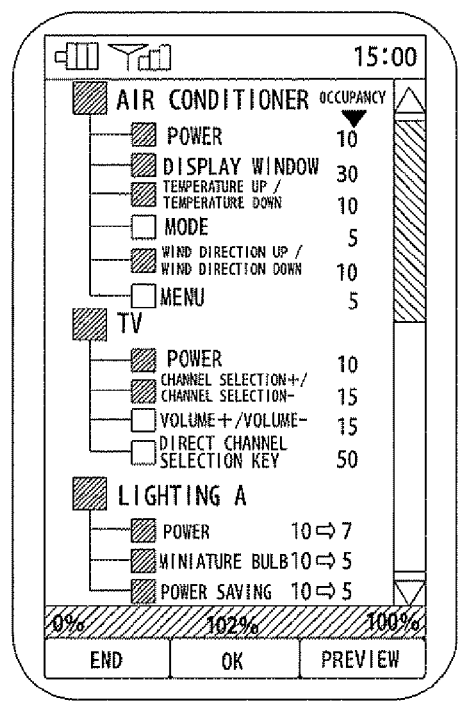
(B) 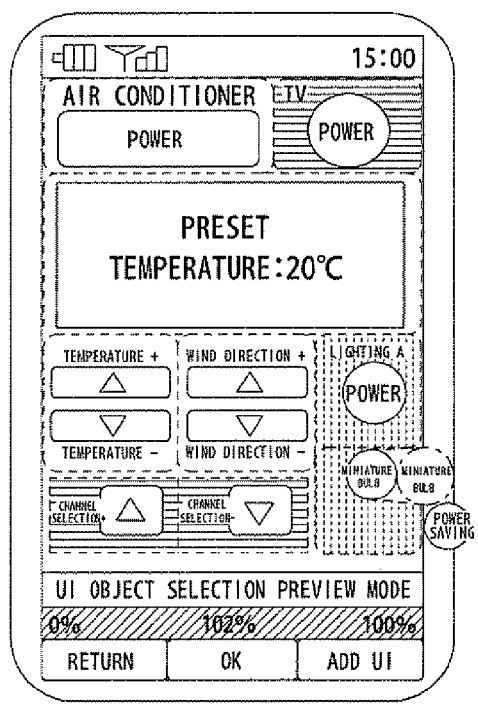
(C) 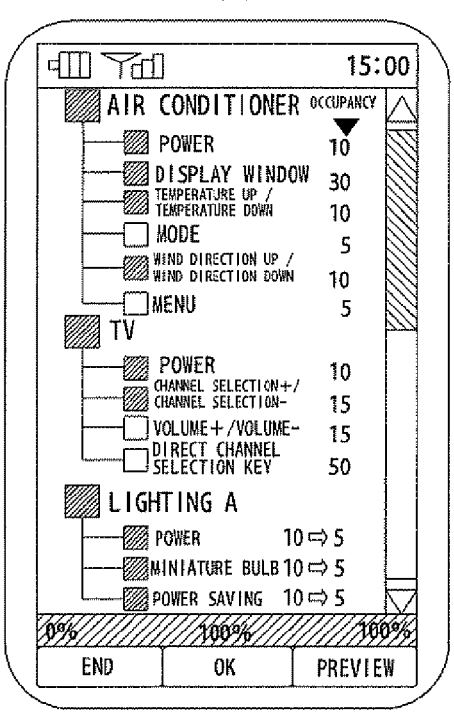
(D) 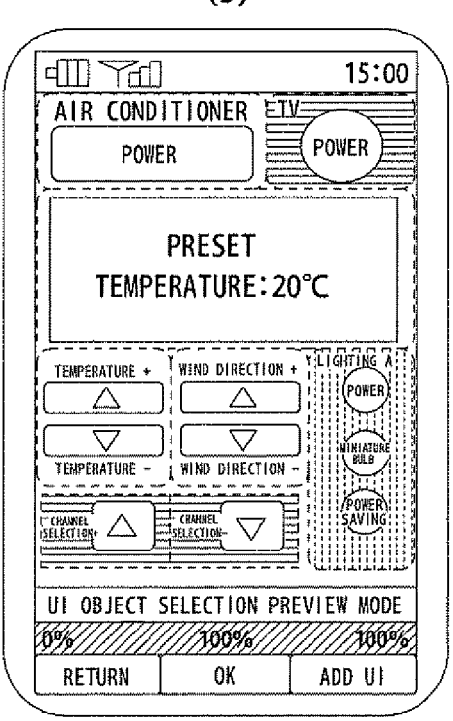

FIG. 10
(A)
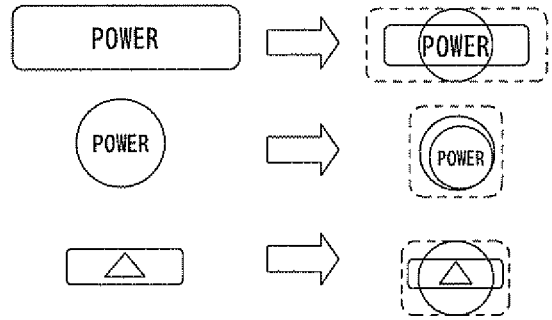
(B)
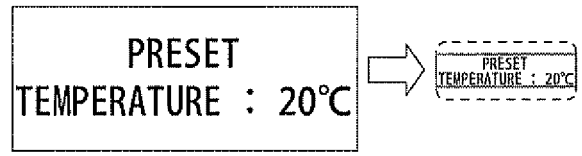
(C)
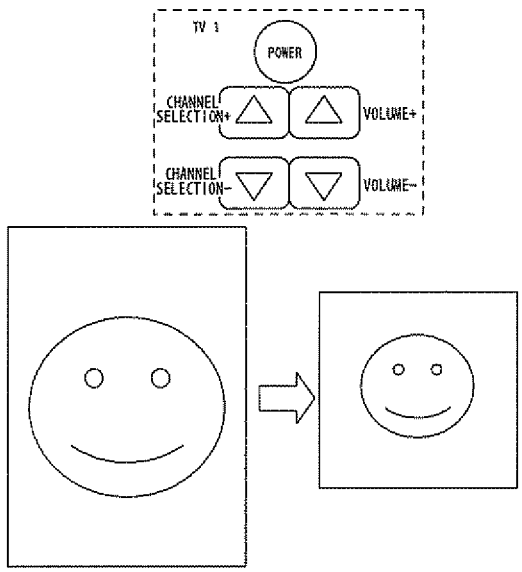

FIG. 11
(A)
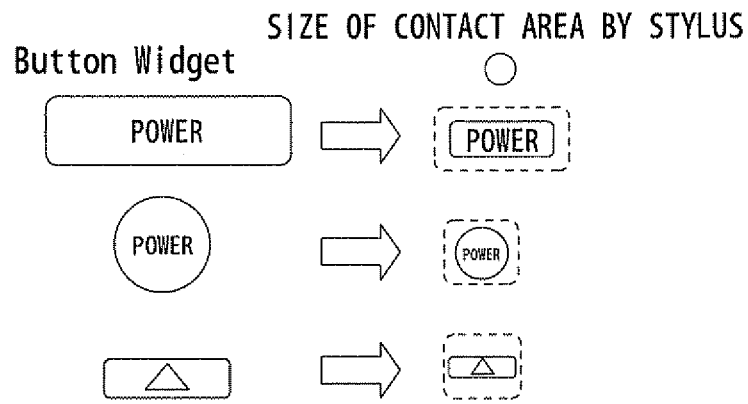
(B)
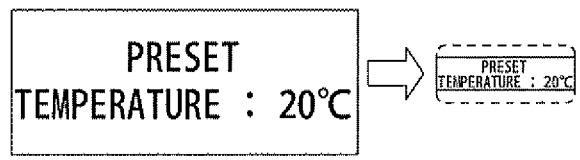
(C)
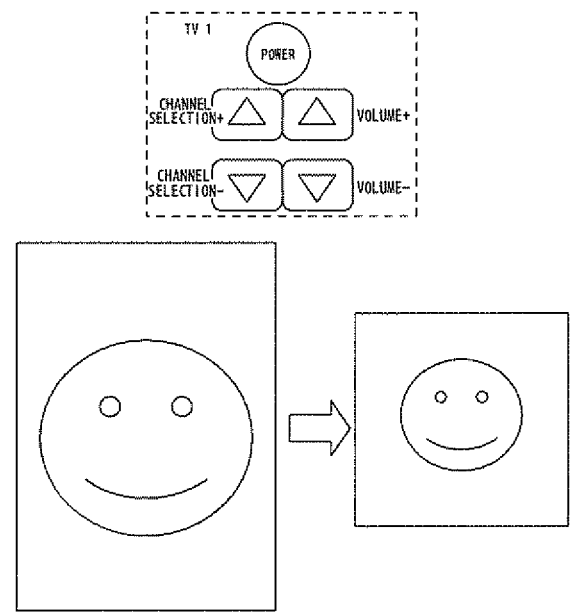

| Priority | Hi | Middle1 | Middle2 | Low |
|---|---|---|---|---|
| VIDEO | POWER | CHANNEL SELECTION+ ▲  ▲ VOLUME+ <br> CHANNEL SELECTION- ▼  ▼ VOLUME- | Chapter:1 0:02 | 1 2 3 / 4 5 6 / 7 8 9 / 10 11 12 <br> ▷▷ FAST-FOWARD <br> REWIND ◁◁ |
| AUDIO | POWER | CHANNEL SELECTION+ ▲  ▲ VOLUME+ <br> CHANNEL SELECTION- ▼  ▼ VOLUME- | CD:10 3:54 <br> RADIO   CD | |

(B)

| Priority | Hi | Middle1 | Middle2 | Low |
|---|---|---|---|---|
| VIDEO | POWER | CHANNEL SELECTION+ ▲  ▲ VOLUME+ <br> CHANNEL SELECTION- ▼  ▼ VOLUME- | Chapter:1 0:02 | 1 2 3 / 4 5 6 / 7 8 9 / 10 11 12 <br> ▷▷ FAST-FOWARD <br> REWIND ◁◁ |
| AUDIO | POWER | CHANNEL SELECTION+ ▲  ▲ VOLUME+ <br> CHANNEL SELECTION- ▼  ▼ VOLUME- | CD:10 3:54 <br> RADIO   CD | |

FIG. 19
(A)
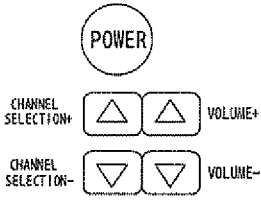
(B)
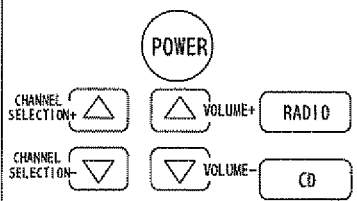

FIG. 21
(A)
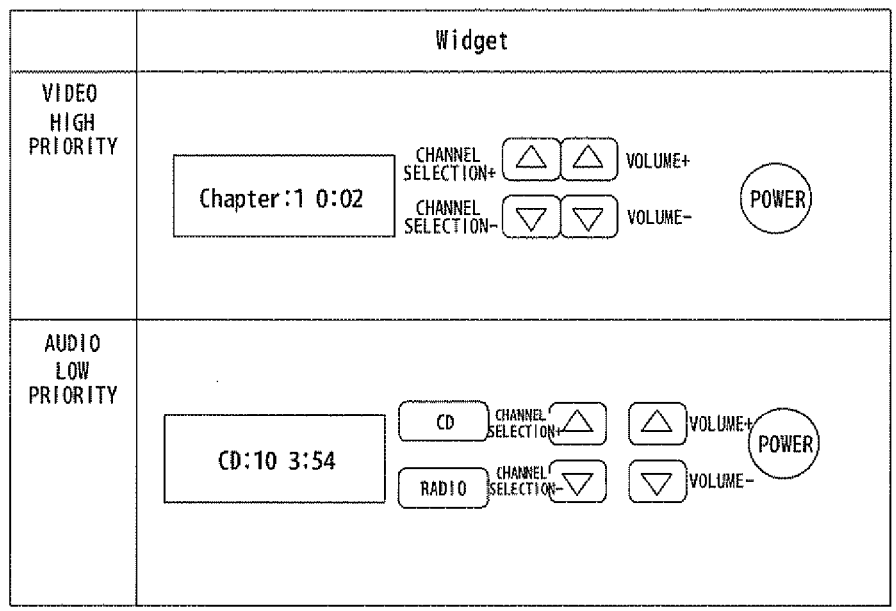
(B)
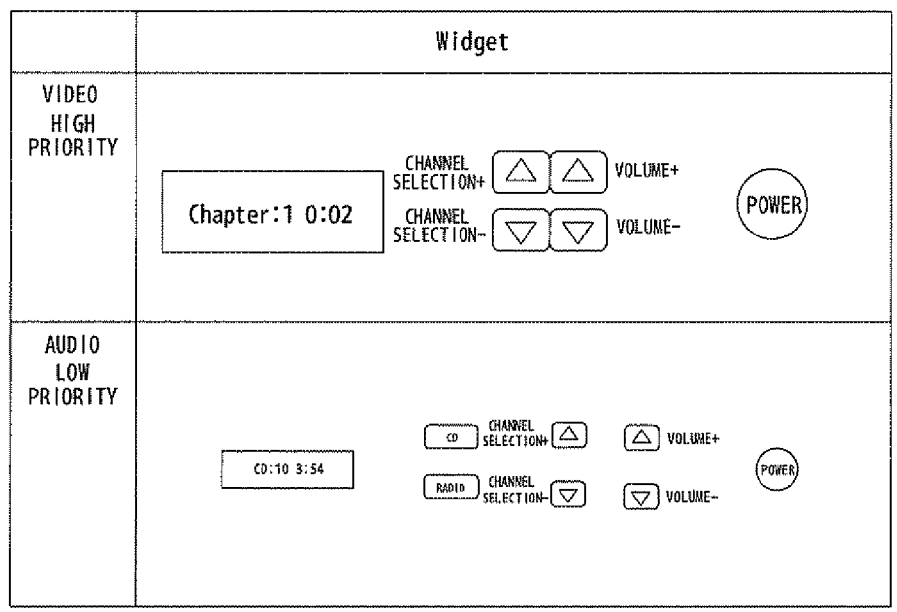

FIG. 23

FIG. 25
(A)
(B)
(C)
(D)
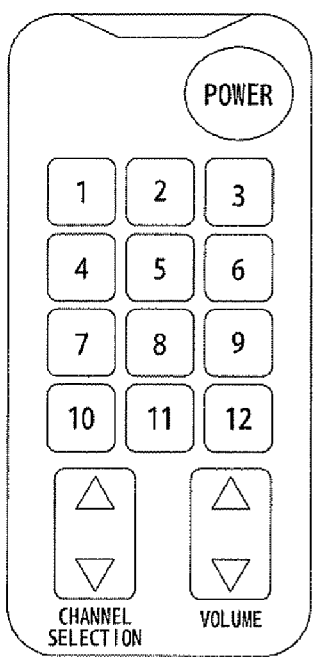
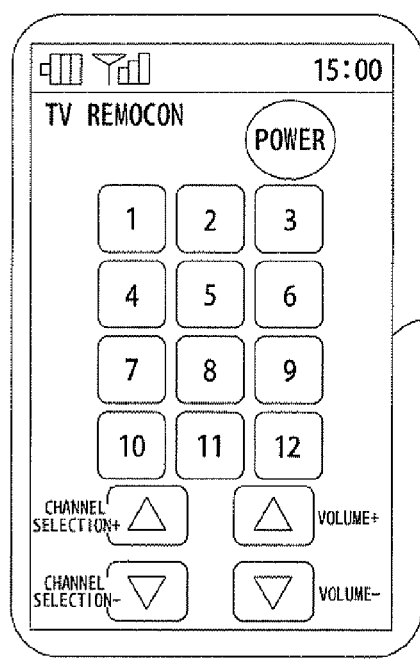
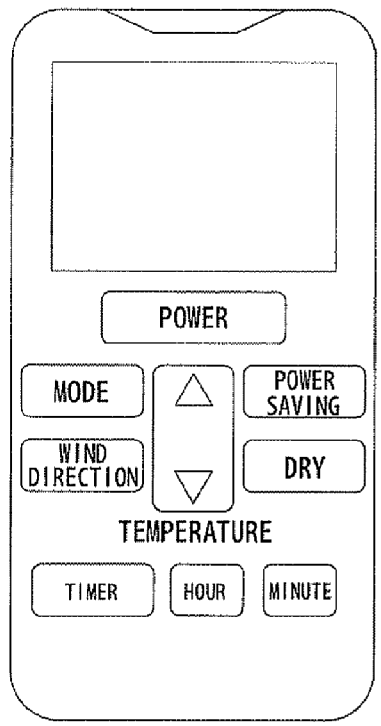
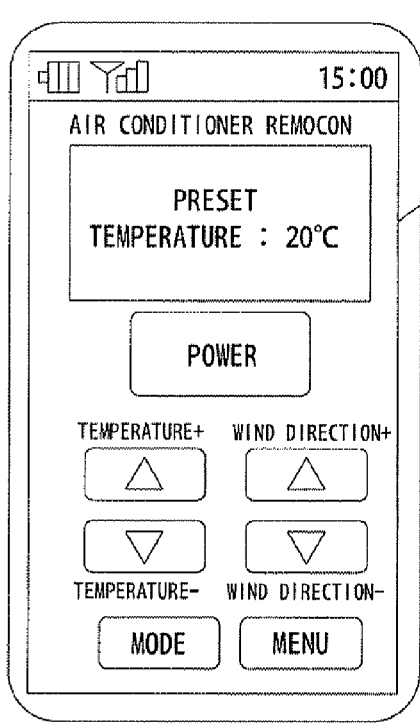

FIG. 26
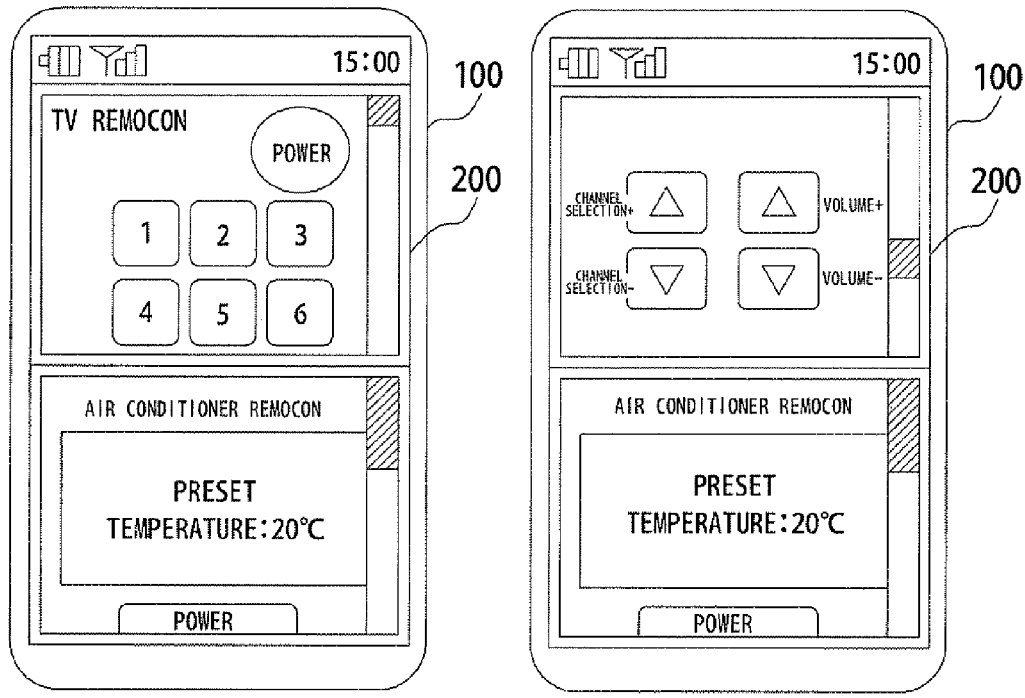
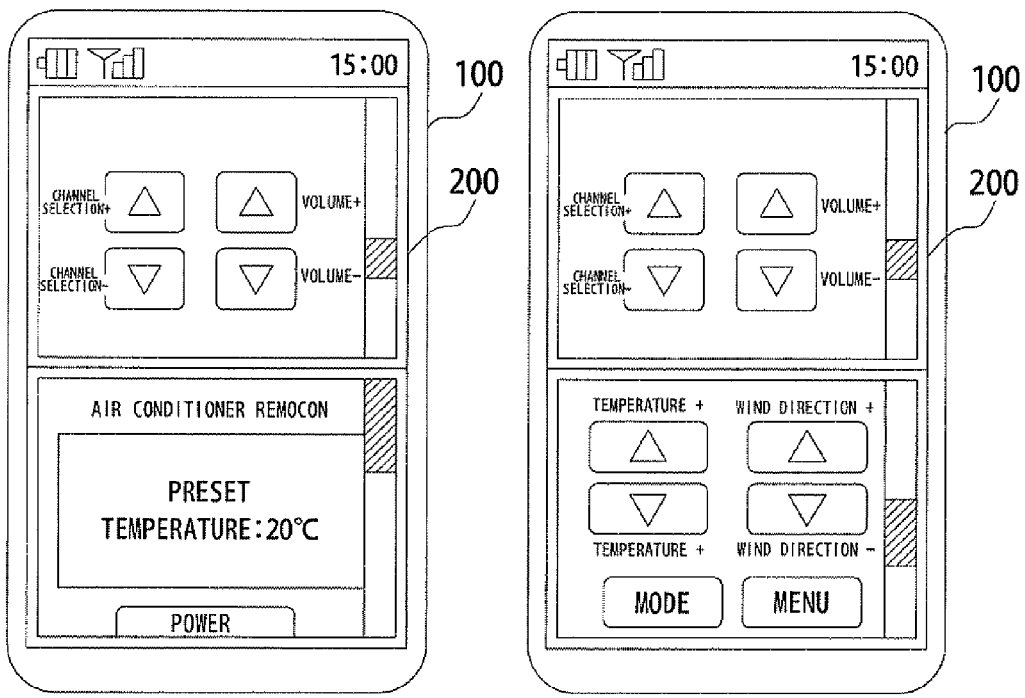

USER INTERFACE GENERATION APPARATUS

CROSS REFERENCE TO RELATED APPLICATIONS

This application claims priority to and the benefit of Japanese Patent Application No. 2008-96604 filed on Apr. 2, 2008 and Japanese Patent Application No. 2008-141257 filed on May 29, 2008, the entire contents of which are incorporated herein by reference.

TECHNICAL FIELD

The present invention relates to user interface generation apparatuses, and particularly, to user interface generation apparatuses for generating user interfaces of mobile terminals.

BACKGROUND ART

The user interface (hereinafter, arbitrarily abbreviated to "UI") of the mobile terminal represented by a mobile phone has a great influence on operability when a user operates the mobile terminal. Accordingly, the UI of the mobile terminal is one of important factors for the user to purchase the mobile terminal.

With significant multi-functioning of the mobile terminal in recent years, there are numerous mobile terminals having picturesque UI using animation and 3D display. In addition, there are mobile terminals having the UI which can be customized as desired by users. Such mobile terminals dramatically improve convenience for the users.

Conventional mobile terminals generally have UI designs and operation methods which are different between manufacturers and models. That is, the UI is unique to each terminal and most of the conventional mobile terminals have UIs highly dependent on models. Therefore, when program codes of another terminal are reused in developing a terminal, it leads to voluminous change in parts of the UI to the program codes. Accordingly, it has been difficult to port program codes of a terminal to another terminal.

In order to deal with such a problem, a UI based on XML (Extensible Markup Language) has been introduced. Expressing the UI by using an XML file whose description method is standardized facilitates reuse of the program codes and enables to port the UI to another model. Accordingly, it also enables to deal with UI alone independently from each terminal, such that the UI can be used by terminals of different models and different manufactures.

Representatives of such XML-based UI are UI Foundation developed by TAT (http://www.tat.se/), VIVID UI developed by Acrodea, Inc. (http://wvvw.acrodea.co.jp/), UI One developed by Qualcomm Incorporated (http://www.qualcomm.co.jp/) and the like.

In addition, with multi-functioning and high-performance of a terminal body, an increasing number of recent mobile terminals mount OS (Operating System) which can perform the multi-task processing for simultaneously executing a plurality of tasks in parallel. Moreover, mobile terminals with a multi-window function to multiplex output screen displays by allocating a plurality of tasks processed in parallel and simultaneously to respective display areas (windows), have been becoming widely used.

Incidentally, Japanese Patent Laid-Open No. 2001-36652 discloses a scheme of remote handling (control) of a plurality of external equipments by infrared communication using a mobile phone terminal having an infrared communication unit. The mobile phone terminal described in Japanese Patent Laid-Open No. 2001-36652 is provided with an external control unit for communicating with the external equipments. This mobile phone terminal stores the external equipment control information for remotely controlling the external equipments, obtained via a telephone line or received from the external equipments, and remotely controls the external equipments based on the external equipment control information. That is, by changing an application program (hereinafter, referred to as "application" simply) incorporated in the terminal, the terminal body, which is normally used as the mobile phone, can be used as a remote controller (hereinafter, referred to as "remocon" simply) for remotely controlling the plurality of external equipments.

SUMMARY OF INVENTION

Technical Problem

According to the mobile phone terminal disclosed in the above Japanese Patent Laid-Open No. 2001-36652, a single mobile phone terminal can remotely control a plurality of external equipments based on respective external equipment control information corresponding to the external equipments. Therefore, there is no need to do cumbersome operation for a user to separately use individual remocon terminals for the plurality of external equipments, which improves convenience for the user.

If such functions of the remocon to remotely switch between the plurality of external equipments to be controlled remotely is implemented in the mobile terminal capable of multi-task processing stated above, it is not necessary to finish a remocon application to initiate another remocon application. That is, it is possible to initiate a plurality of applications on a single terminal at the same time and to use a desired remocon application among them timely.

However, the operation to switch a plurality of applications frequently is cumbersome.

If the multi-windows function stated above is embedded in the mobile terminal, UIs for operating a plurality of applications can be displayed on a plurality of windows, respectively. Thereby, it is possible to use the applications on a single screen simultaneously without switching among the plurality of applications.

For a TV remocon terminal alone as shown in FIG. 25(A), for example, a UI of TV remocon application may be reproduced on a touch panel 200 of a mobile terminal 100, for example, while maintaining operability of the TV remocon terminal, as shown in FIG. 25(B). Although keys such as numerical keys or buttons of the remocon terminal shown in FIG. 25(A) are mechanical keys, the numerical keys or the buttons are reproduced as objects and displayed on the touch panel 200 of the mobile terminal 100 shown in FIG. 25(B). Hereinafter, a variety of keys or buttons and information displaying spots composing the UI are referred to as "UI object". Similarly, for an air conditioner remocon terminal alone as shown in FIG. 25(C), a UI of air conditioner remocon application may be reproduced on the touch panel 200 of the mobile terminal 100, while maintaining operability of the air conditioner remocon terminal, as shown in FIG. 25(D). Moreover, if each UI of application is described in XML as the basis, almost the same UI can be easily reproduced in another terminal only by processing the XML file describing the UI, even if the application is ported to the another terminal of a different manufacturer.

However, in order to operate an air conditioner while viewing a TV in the above example, there may be a need for cumbersome operations for both of the TV and the air conditioner. In such a case, the applications for both the TV and the air conditioner may be displayed simultaneously by dividing a display area of the display unit by using the multi-task function and the multi-window function. However, simultaneous display of the UIs results in displays as shown in FIG. 26(A) to (D), as each application has only the UI which assumed to be used solely.

FIG. 26(A) to (D) are diagrams illustrating states when the UIs of two applications are simultaneously displayed on the mobile terminal 100 having the multi-task function and the multi-window function. In the examples shown in the figures, only a part of each UI is displayed, as each of the UIs is reproduced as it stands in each of the windows vertically separating the display unit of the touch panel 200. A scroll bar is provided on the right in each window so as to enable operation of parts beyond the screen.

In order to adjust volume of the TV in a state shown as FIG. 26(A), for example, the user needs to move the scroll bar in the window of the TV remocon UI so as to move a displayed area of the TV remocon UI, as shown in FIG. 26(B). Similarly, in order to adjust temperature of the air conditioner in a state shown as FIG. 26(C), for example, the user needs to move the scroll bar in the window of the air conditioner remocon UI so as to move a displayed area of the air conditioner remocon UI, as shown in FIG. 26(D). Moreover, when a plurality of applications are activated by the multi-window function and the UIs are displayed overlapping each other, it is necessary to select the window to activate it before starting input operation.

If the UIs assumed to be used alone and thus designed to occupy an entire screen are displayed in multi-window, all of the UI objects cannot be fit in the screen, which leads to deterioration of operability.

Therefore, it is an object of the present invention in consideration of such conditions to provide user interface generation apparatuses capable of fitting necessary user interface objects in a predetermined user interface object display area, when generating a user interface composed of a plurality of user interface objects.

Solution to Problem

In order to achieve the above object, a user interface generation apparatus according to a first aspect includes:

an application program execution unit for implementing a variety of functions based on an application program;

a user interface generation unit for generating a user interface for instructing the application program execution unit to execute a predetermined function based on the application program;

a display unit for displaying the user interface generated by the user interface generation unit; and a memory unit for storing user interface definition file including user interface object definition information defining a user interface object, which is a component of the user interface, as well as storing apparatus-dependent information indicating characteristic of the user interface generation apparatus, wherein the user interface generation unit performs user interface compound processing comprising: making a selection of the user interface object definition information stored in the memory unit; determining whether all of selected user interface objects can be displayed in a predetermined display area of the display unit; rewriting, if impossible to display, size information on a display size of the user interface object included in the user interface object definition information based on the apparatus-dependent information such that all of the selected user interface objects can be displayed; and generating a compound user interface based on the user interface object definition information with rewritten size information.

A second aspect of the present invention is the user interface generation apparatus according to the first aspect, further including a minimum size setting unit for setting a minimum value of the display size of the user interface object based on a type of the user interface object, the user interface object definition information and the apparatus-dependent information, wherein the user interface generation unit rewrites the size information with the minimum value, set by the minimum size setting unit, as a lower limit.

A third aspect of the present invention is that, in the user interface generation apparatus according to the second aspect, the minimum size setting unit sets the minimum value of the display size of the user interface object based on at least one of a minimum font size, a minimum line spacing and input device information, which are included in the apparatus-dependent information.

A fourth aspect of the present invention is the user interface generation apparatus according to any one of the first to the third aspects, further including a selection screen generation unit for generating a selection screen for receiving selection of the user interface object based on the user interface object definition information, wherein the user interface generation unit selects the user interface object definition information to rewrite the size information based on a selection order of the user interface object selected on the selection screen and rewrites the size information of the selected user interface object definition information.

A fifth aspect of the present invention is that, in the user interface generation apparatus according to any one of the first to the third aspects, wherein the user interface object definition information includes priority order information indicating a priority order between the user interface objects composing the user interface, and the user interface generation unit selects the user interface object definition information to rewrite the size information based on the priority order information and rewrites the size information of selected user interface object definition information.

A sixth aspect of the present invention is that, in the user interface generation apparatus according to the second or the third aspect, wherein the user interface generation unit selects the user interface object definition information to rewrite the size information based on a ratio between the size information and the minimum value set by the minimum size setting unit and rewrites the size information of the selected user interface object definition information.

A user interface generation apparatus according to a seventh aspect includes:

an application program execution unit for implementing a variety of functions based on an application program;

a user interface generation unit for generating a user interface for instructing the application program execution unit to execute a predetermined function based on the application program;

a display unit for displaying the user interface generated by the user interface generation unit;

a memory unit for storing user interface definition file including user interface object definition information defining a user interface object, which is a component of the user interface, as well as storing apparatus-dependent information indicating characteristic of the user interface generation apparatus; and a selection screen generation unit for generating a selection screen for receiving selection of the user interface object based on the user interface object definition information, wherein the selection screen generation unit, if it is instructed to compound a plurality of user interfaces, generates the selection screen based on the user interface object definition information included in the user interface definition file stored in the memory unit correspondingly to each of the plurality of user interfaces instructed, and the user interface generation unit performs user interface compound processing comprising: determining whether all of user interface objects selected on the selection screen can be displayed based on a user interface display area of the display unit capable of displaying the user interface and the user interface object definition information; rewriting, if impossible to display, size information on a display size of the user interface object included in the user interface object definition information based on the apparatus-dependent information such that all of the selected user interface objects can be displayed; and generating a compound user interface based on the user interface object definition information with rewritten size information.

A user interface generation apparatus according to an eighth aspect includes:

an application program execution unit for implementing a variety of functions based on an application program;

a user interface generation unit for generating a user interface for instructing the application program execution unit to execute a predetermined function based on the application program;

a display unit for displaying the user interface generated by the user interface generation unit; and a memory unit for storing user interface definition file including user interface object definition information defining a user interface object, which is a component of the user interface, as well as storing apparatus-dependent information indicating characteristic of the user interface generation apparatus, wherein the user interface object definition information includes, for an essential user interface object among user interface objects composing the user interface, essentiality information indicating that the user interface object is essential, and the user interface generation unit performs user interface compound processing comprising: determining whether all of the essential user interface objects can be displayed based on a user interface display area of the display unit capable of displaying the user interface and the essentiality information; rewriting, if impossible to display, size information on a display size of the user interface object included in the essential user interface object definition information such that all of the essential user interface objects can be displayed; and generating a compound user interface based on the user interface object definition information with rewritten size information.

A ninth aspect of the present invention is the user interface generation apparatus according to any one of the first, the seventh and the eighth aspects, further including an operation input reception unit for receiving input to instruct the application program execution unit, via the user interface, to execute a predetermined function based on the application program; and an operation input device determination unit for determining an operation input device to the operation input reception unit, wherein the user interface generation unit rewrites the apparatus-dependent information in accordance with the operation input device determined by the operation input device determination unit.

A tenth aspect of the present invention is that, in the user interface generation apparatus according to the ninth aspects, wherein the user interface generation unit, if change of the operation input device is detected by the operation input device determination unit while the compound user interface is displayed on the display unit, rewrites the apparatus-dependent information in accordance with the changed operation input device, and generates a new compound user interface based on the apparatus-dependent information rewritten.

BRIEF DESCRIPTION OF DRAWING

FIG. 5 is a diagram illustrating exemplary user interface object selection screens and preview screens according to a first embodiment;

FIG. 6 is a diagram illustrating exemplary user interface object selection screens and preview screens according to the first embodiment;

FIG. 7 is a diagram illustrating exemplary user interface object selection screens and preview screens according to the first embodiment;

FIG. 8 is a diagram illustrating exemplary user interface object selection screens and preview screens according to the first embodiment;

FIG. 10 is a diagram illustrating the minimum display sizes by type of user interface objects when operation input is performed by a finger, according to the first embodiment;

FIG. 11 is a diagram illustrating the minimum display sizes by type of user interface objects when operation input is performed by a stylus, according to the first embodiment;

FIG. 17 is a diagram illustrating reduction processing of the user interface objects categorized based on a setting according to the second embodiment;

FIG. 19 is a diagram illustrating reduction processing of the user interface objects categorized based on a setting according to a third embodiment;

FIG. 21 s a diagram illustrating reduction processing of the user interface objects categorized based on a setting according to a fourth embodiment;

FIG. 23 is a diagram illustrating reduction processing of the user interface objects categorized based on a setting according to a fifth embodiment;

FIG. 25 is a diagram illustrating states of conventional remocon terminals reproduced by the user interfaces of a mobile terminal; and FIG. 26 is a diagram exemplifying compound of two user interfaces by a conventional mobile terminal.

Figure 1:
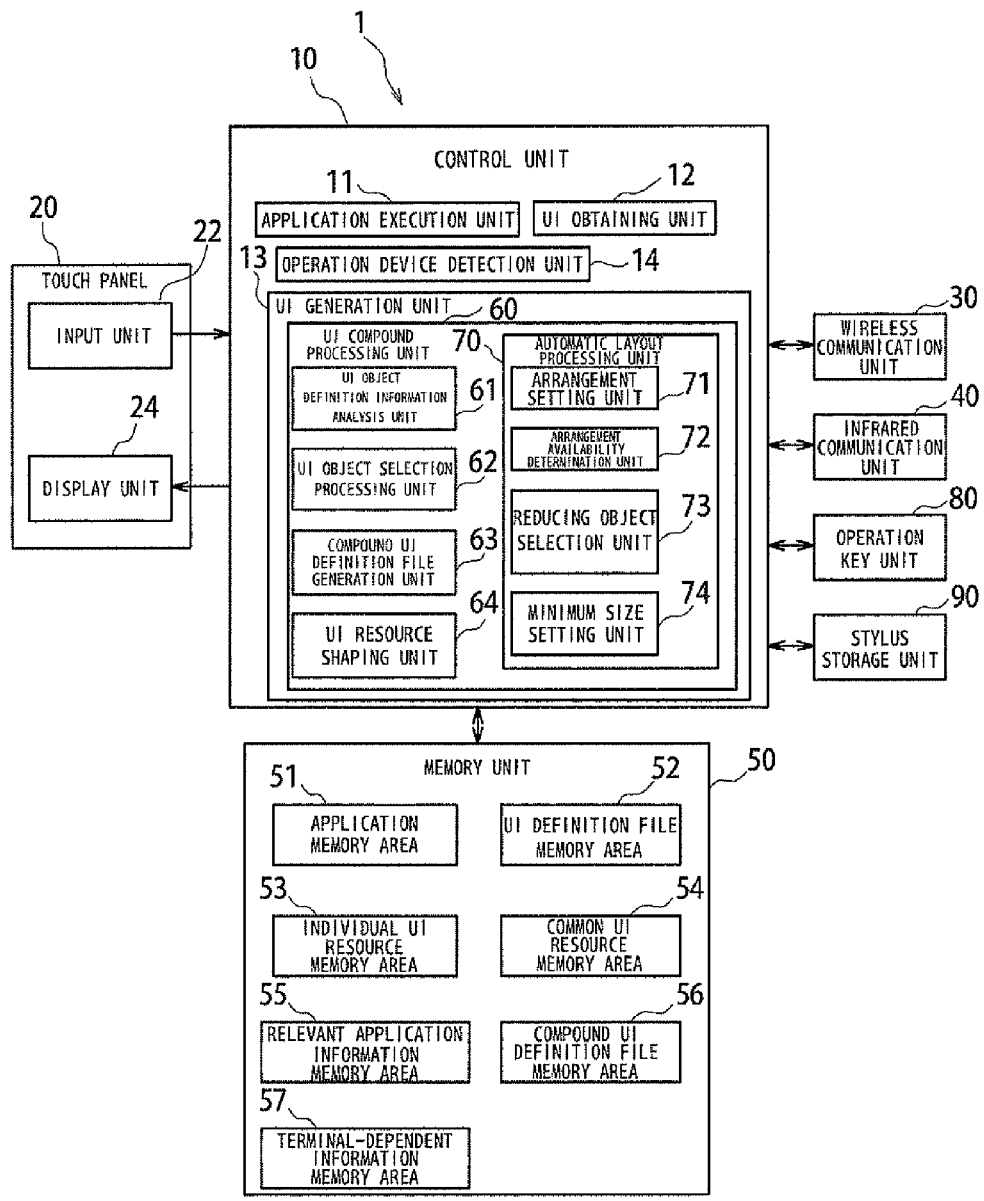
FIG. 1 is a block diagram illustrating a schematic configuration of a user interface generation apparatus according to the present invention.

REFERENCE SIGNS LIST 1 mobile phone
10 control unit
11 application program execution unit
12 user interface obtaining unit
13 user interface generation unit
14 operation device detection unit
20 touch panel
22 input unit
24 display unit
30 wireless communication unit
40 infrared communication unit
50 memory unit
51 application program memory area
52 user interface definition file memory area
53 individual user interface resource memory area
54 common user interface resource memory area
55 relevant application program information memory area
56 compound user interface definition file memory area
57 terminal-dependent information memory area
60 user interface compound processing unit
61 user interface object definition information analysis unit
62 user interface object selection processing unit
63 compound user interface definition file generation unit
64 user interface resource shaping unit
70 automatic layout processing unit
71 arrangement setting unit
72 arrangement availability determination unit
73 reducing object selection unit
74 minimum size setting unit
80 operation key unit
90 stylus storage unit

DESCRIPTION OF EMBODIMENTS

Embodiments of the present invention will be described with reference to the accompanying drawings. In each of the embodiments described below, a mobile phone having a remocon function for remotely controlling various external apparatuses is used as an example of a user interface (hereinafter, referred to as "UI") generation apparatus according to the present invention. However, the UI generation apparatus according to the present invention is not limited to the mobile phone but may be applicable to any portable terminals such as, for example, a laptop computer, PDA and the like. In addition, the UI generation apparatus according to the present invention is also applicable to an apparatus which needs to mount it, even if it is not a mobile terminal. It is to be noted that the present invention primarily intends to compound a plurality of UIs to be used simultaneously. Therefore, an application instructed by each UI is not limited to a remocon function but the present invention may be applicable to various kinds of applications.

(First Embodiment)

FIG. 1 is a block diagram illustrating a schematic configuration of a UI generation apparatus according to the first embodiment of the present invention.

A mobile phone 1 includes a control unit 10 for controlling the overall operation and a touch panel 20 for receiving input by a user and for displaying a result of input and the like, according to each application. The touch panel 20 has an input unit 22 constituted of matrix switches and the like to receive input by the user and arranged on top of a display unit 24 constituted of a liquid crystal display and the like. The input unit 22 of the touch panel 20, when detects contact of a finger of the user or a pen-shaped input device such as a stylus, outputs a signal corresponding to input by such contact. The display unit 24 displays a screen in relation to an application program, as well as displaying an image of a UI, which is composed of UI objects such as various types of keys or buttons for receiving input by the user, in a predetermined UI display area.

In addition, the mobile phone 1 further includes a wireless communication unit 30 for transmitting and receiving various information such as voice call, data of e-mail and the like to/from a base station (not shown) via internet, by radio or the like, and an infrared communication unit 40 for communicating with various external equipments (not shown) by using infrared rays. The mobile phone 1 transmits and receives a variety of data to/from external equipments by using the wireless communication unit 30 via the internet, by radio and the like.

The mobile phone 1 further includes an operation key unit 80 and a stylus storage unit 90. The operation key unit 80 includes a plurality of keys constituted of mechanical switches disposed on a body of the mobile phone 1 or a direction indicator key or a direction indicator device for moving a pointer displayed on the display unit 24. The operation key unit 80 transmits a corresponding signal to the control unit 10 in response to input by the user. Uses and functions of the variety of keys constituting the operation key unit 80 are defined in accordance with an application to be used. Accordingly, in the present embodiment, an operation input reception unit is configured including the input unit 22 of the touch panel 20 and the operation key unit 80, The stylus storage unit 90 stores the stylus, the pen-shaped input device for input to the input unit 22 of the touch panel 20. By storing the stylus in the stylus storage unit 90, it is possible to store the stylus in the body of the mobile phone 1. The stylus storage unit 90 has a switch (not shown) to detect attach and detach of the stylus. That is, the switch is turned on/off in response to an operation to store the stylus in the stylus storage unit 90 and an operation to take the stylus out of the stylus storage unit 90. Accordingly, the control unit 10 can determine whether the stylus is stored in the stylus storage unit 90, that is, whether the stylus is stored in the body of the mobile phone 1, by a signal from the stylus storage unit 90.

Furthermore, the mobile phone 1 includes a memory unit 50 for storing input information and various applications and also for functioning as a work memory. The memory unit 50 includes an application memory area 51, a UI definition file memory area 52, an individual UI resource memory area 53, a common UI resource memory area 54, a relevant application information memory area 55, a compound UI definition file memory area 56, and a terminal-dependent information memory area 57.

The control unit 10 includes an application execution unit 11, a UI obtaining unit 12, a UI generation unit 13, and an operation device detection unit 14.

The application execution unit 11 of the control unit 10 reads out and executes various applications stored in the application memory area 51 of the memory unit 50, as well as controlling such execution. In addition, the application execution unit 11, based on input to the UI corresponding to the application being read out from the application memory area 51 and executed, executes functions of the application corresponding to the input.

The UI obtaining unit 12 obtains resource (image data and the like) and a UI definition file (XML file and the like) from outside the terminal via the wireless communication unit 30. The UI generation unit 13 performs a parsing process and a DOM (Document Object Model) process on the UI definition file, and generates a UI to be used actually. The UI generation unit 13 interprets UI information, described in an XML form, by using an XML engine and displays the UI generated based on the UI definition file on the display unit 24 of the touch panel 20.

The UI generation unit 13 includes a UI compound processing unit 60, for performing compound processing of UIs based on a plurality of UI definition files. The UI compound processing unit 60 includes a UI object definition information analysis unit 61, a UI object selection processing unit 62, a compound UI definition file generation unit 63, a UI resource shaping unit 64 and an automatic layout processing unit 70.

The UI object definition information analysis unit 61 analyzes the UT object definition information defining various UI objects included in the UI definition file.

The UI object selection processing unit 62 performs processing to select a necessary UI object from numerous UI objects, either automatically or by input of the user. When selection is performed by input of the user, the UI object selection processing unit 62 performs processing and control for generating a selection screen for receiving input to select a UI object by the user, by analyzing the UI object definition information defining the UI object to be displayed on the display unit 24. Hereinafter, the screen displaying information on the UI object on the display unit 24 to receive selection input by the user is referred to as a "UI object selection screen" or simply "selection screen". Accordingly, the UI object selection processing unit 62 constitutes a selection screen generation unit, according to the present embodiment. Moreover, the UI object selection processing unit 62, when instructed to compound a plurality of UIs, compounds the UIs based on a plurality of specified UI definition files.

The UI object selection processing unit 62 includes an occupancy accumulation unit (not shown) for accumulating occupancies of selected UI objects on the UI object selection screen. The occupancy accumulation unit accumulates occupancies of UI objects based on UI object attribute information included in the UI object definition information of each UI object and the terminal-dependent information (apparatus-dependent information) stored in the terminal-dependent information memory area 57.

The compound UI definition file generation unit 63 generates and outputs a UI compounded by the UI compound processing unit 60, as a compound UI definition file.

The UI resource shaping unit 64 performs preview processing of selected UI objects and processing to enlarge or reduce data of resource used to compound UIs, based on a display size of each UI object. In this case, the UI resource shaping unit 64 reads out and uses data of resource stored in the individual UI resource memory are 53 or the common UI resource memory area 54.

The automatic layout processing unit 70 performs control and processing related to the layout when compounding the UIs. Therefore, the automatic layout processing unit 70 includes an arrangement setting unit 71, an arrangement availability determination unit 72, a reducing object section unit 73 and a minimum size setting unit 74.

The arrangement setting unit 71 arranges UI objects in accordance with a predetermined procedure. The arrangement setting unit 71 includes a margin setting unit (not shown). The margin setting unit sets an adequate space (margin) when a UI object is arranged, such that the UI object is not too close to another UI object or an edge of the UI display area. The arrangement availability determination unit 72 determines whether the UI objects arranged by the arrangement setting unit 71 can be arranged in a predetermined UI display area. If the arrangement availability determination unit 72 determines that the UI object cannot be arranged in the predetermined UI display area, the reducing object selection unit 73 selects a UI object to be reduced, following a predetermined procedure. The minimum size setting unit 74 sets a lower limit of reduction for each UI object in accordance with the terminal-dependent information or the UI object definition information.

The operation device detection unit 14 detects a device with which the user performs input operation. For example, if there is an input signal from the input unit 22 of the touch panel 20, the operation device detection unit 14 determines that the user inputs with the touch panel. Meanwhile, if there is an input signal from the operation key unit 80, the operation device detection unit 14 determines that the user inputs with the operation keys.

If input is detected from the input unit 22 of the touch panel 20 and an area on the input unit 22 from which input is detected is larger than a predetermined area, the operation device detection unit 14 determines that the user inputs with his/her finger. Meanwhile, if the area from which input is detected is smaller than the predetermined area and very small, the operation device detection unit 14 determines that the user inputs with a pointed input device, such as the stylus. In addition, if it is detected that the stylus is taken out of the stylus storage unit 90, the operation device detection unit 14 determines that input will be performed with the stylus thereafter. Moreover, when it is detected that the stylus is stored in the stylus storage unit 90, the operation device detection unit 14 determines that input will be performed without the stylus thereafter. That is, in this case, the operation device detection unit 14 expects input on the display unit 20 with the finger or the operation key unit 80.

Furthermore, if the pointer for selecting an input spot is displayed on the display unit 24 in accordance with a predetermined operation, the operation device detection unit 14 expects input from the direction indicator key or the direction indicator device of the operation key unit 80 for moving the pointer.

The application memory area 51 of the memory unit 50 stores a variety of applications constituted of data describing a procedure to implement various functions. The UI definition file memory area 52 stores the UI definition file defining a sequence of generation rules to generate each UI overall. The individual UI resource memory area 53 stores individual UI resource such as image data and character string (text) data used to generate UI unique to each application. The common UI resource memory area 54 stores common UI resource such as image data and font data commonly used by the UIs used by the terminal, except for the individual UI resource unique to each application. When the UI is actually generated, image data, text data and the like stored in the individual UI resource memory area 53 and the common UI resource memory area 54 are displayed on the display unit 24 of the touch panel 20.

In addition, the relevant application information memory area 55 stores relevant application information including activation information of an application relevant to the UI object and the like. The compound UI definition file memory are 56 stores the compound UI definition file generated by the compound UI definition file generation unit 63. The terminal-dependent information memory area 57 stores the terminal-dependent information (apparatus-dependent information) which is information indicating characteristics unique to the terminal and depending on the terminal and the display unit 24, such as font information, input device information and image size information which can be used by the terminal itself.

Next, the UI definition file stored in the UI definition file memory area 52 according to the present embodiment is described.

The UI definition file memory area 52 of the memory unit 50 stores the UI definition file defining specifications and operations of an application of a UI, required to execute the application stored in the application memory area 51. Although the same UI may be used by different applications, here it is assumed that the UI used by each application differs from one another, for convenience of description, and that each UI definition file corresponding to each application is stored.

For example, a TV remocon UI definition file is stored in the UI definition file memory area 52, correspondingly to a TV remocon application for remotely controlling a TV set (not shown), which is an external equipment, by using the mobile phone 1. Similarly, an air conditioner remocon UI definition file is stored in the UI definition file memory area 52, correspondingly to an air conditioner remocon application for remotely controlling an air conditioner (not shown), which is another external equipment, by using the mobile phone 1.

In the present embodiment, a UIML (User Interface Markup Language) form based on XML language is used as an example of a language to describe the UI definition file. In order to activate a UI to use, the UI generation unit 13 displays the UI on the display unit 24 of the touch panel 20 of the mobile phone 1 in accordance with definition described in the UIML form, and the application execution unit 11 executes processing in response to input to the input unit 22 by the user.

Figure 2:
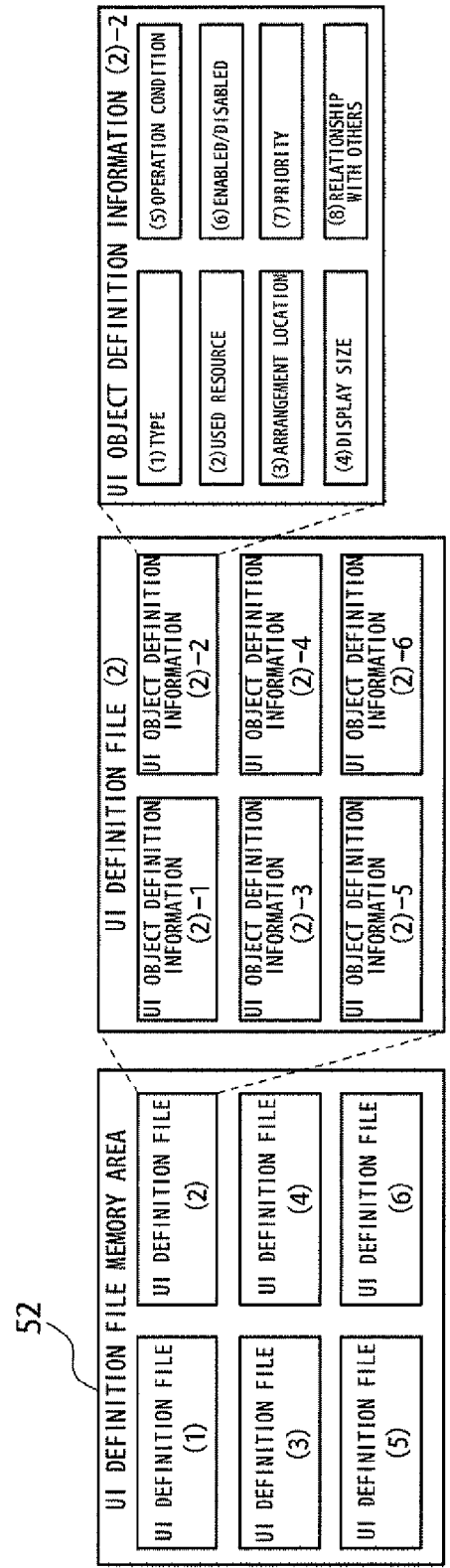
FIG. 2 is a conceptual diagram illustrating a configuration of a user interface definition file according to the present invention.

FIG. 2 is a conceptual diagram illustrating a configuration of the UI definition file. As shown in FIG. 2, the UI definition file memory area 52 of the memory unit 50 of the mobile phone 1 stores the UI definition file defining a sequence of generation rules to generate an entire UI. Although six UI definition files (1) to (6) are stored in FIG. 2, the UI definition file memory area 52 may store any number of UI definition files in accordance with the UI to be used.

In addition, as shown in FIG. 2, each UI definition file includes a plurality of UI object definition information. Although the UI definition file (2) includes six UI object definition information in FIG. 2, the UI definition file (2) includes the UI object definition information as many as the UI objects included in the UI composed based on the UI definition file (2), in practice.

Each UI object definition information included in the UI definition file includes information indicating various attribute in relation to the UI object defined by the UI object definition information, as shown in the figure. The followings are examples of representative information included in the UI object definition information:

(1) type information of a component (UI object): information specifying a type, such as whether the UI object has a function of a button or key, a text box function to display information, or function simply as an image to be displayed on the display unit 24;

(2) resource information used for the UI object: information defining an image and a text for displaying the UI object such as a key or button, composing the UI to be displayed on the display unit 24;

(3) location information for arranging the UI object: information specifying where to display the UI object in a predetermined UI display area;

(4) information on display size of the UI object: information specifying a size of the UI object when displayed in the UT display area;

(5) operational condition information of the UI object: information specifying an operation to an application when there is input to the UI object (when there is input to a portion of the input unit 22 corresponding to the UI object, in practice);

(6) information to enable or disable the UT object: information specifying whether to display the UI object in the UI display area or whether to activate the UI object;

(7) priority order information of the UI object: information indicating priority of the object when a plurality of UIs are compounded based on a relationship between the UI object and other UI objects; and (8) relationship information between the UI object and another UI object: information, when the UI object has a predetermined relationship with another UI object, specifying the relationship.

According to the present embodiment, a plurality of UI objects are displayed in a single UI display area based on selection by the user. At this time, it is possible to select a plurality of UI objects from a single UI or from a plurality of UIs. Although each UI has a corresponding UI definition file, the compound UI composed of the UI objects arbitrarily selected by the user does not have a corresponding UI definition file originally. Therefore, when the compound UI composed of the UI objects selected by the user is generated, a compound UI definition file is generated based on the compound UI and stored.

Figure 3:
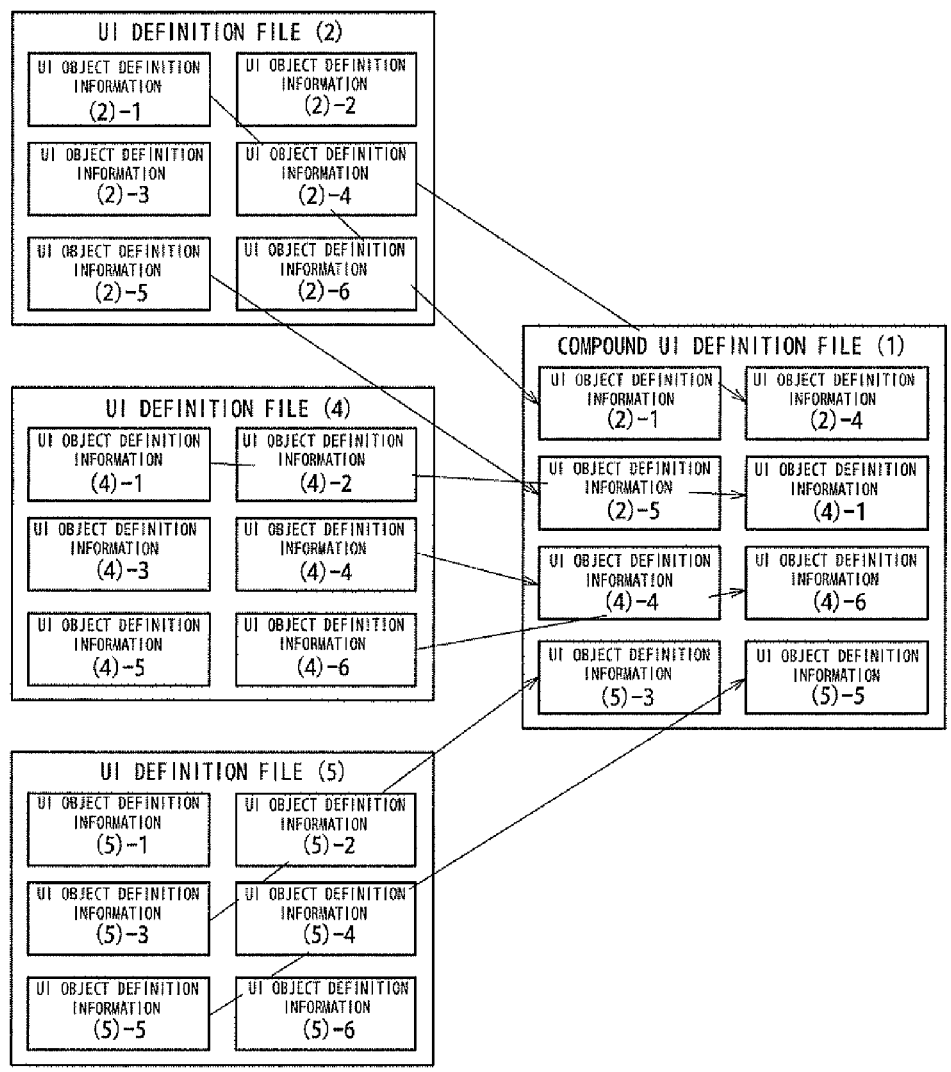
FIG. 3 is a conceptual diagram illustrating a configuration of a compound user interface definition file according to the present invention.

FIG. 3 is a conceptual diagram illustrating a configuration of the compound UI definition file. The compound UI definition file is a single UI definition file having extracted parts of the UI object definition information included in a plurality of UI definition files, collectively. When a plurality of UIs are compounded, the UI object selection processing unit 62 of the UI compound processing unit 60 generates the UI object selection screen based on each UI definition file and extracts UI object definition information of the UI objects selected by the user. The compound UI definition file generation unit 63 collects extracted UI object definition information into a single compound UI definition file. This means that, from the user's point of view, the UI objects are selected from the plurality of UIs and a single compound UI is generated by adopting them. When generating the compound UI definition file, the UI compound processing unit 60 may process the UI object definition information, if necessary, before being collected into the single compound UI definition file as the compound UI.

Figure 4:
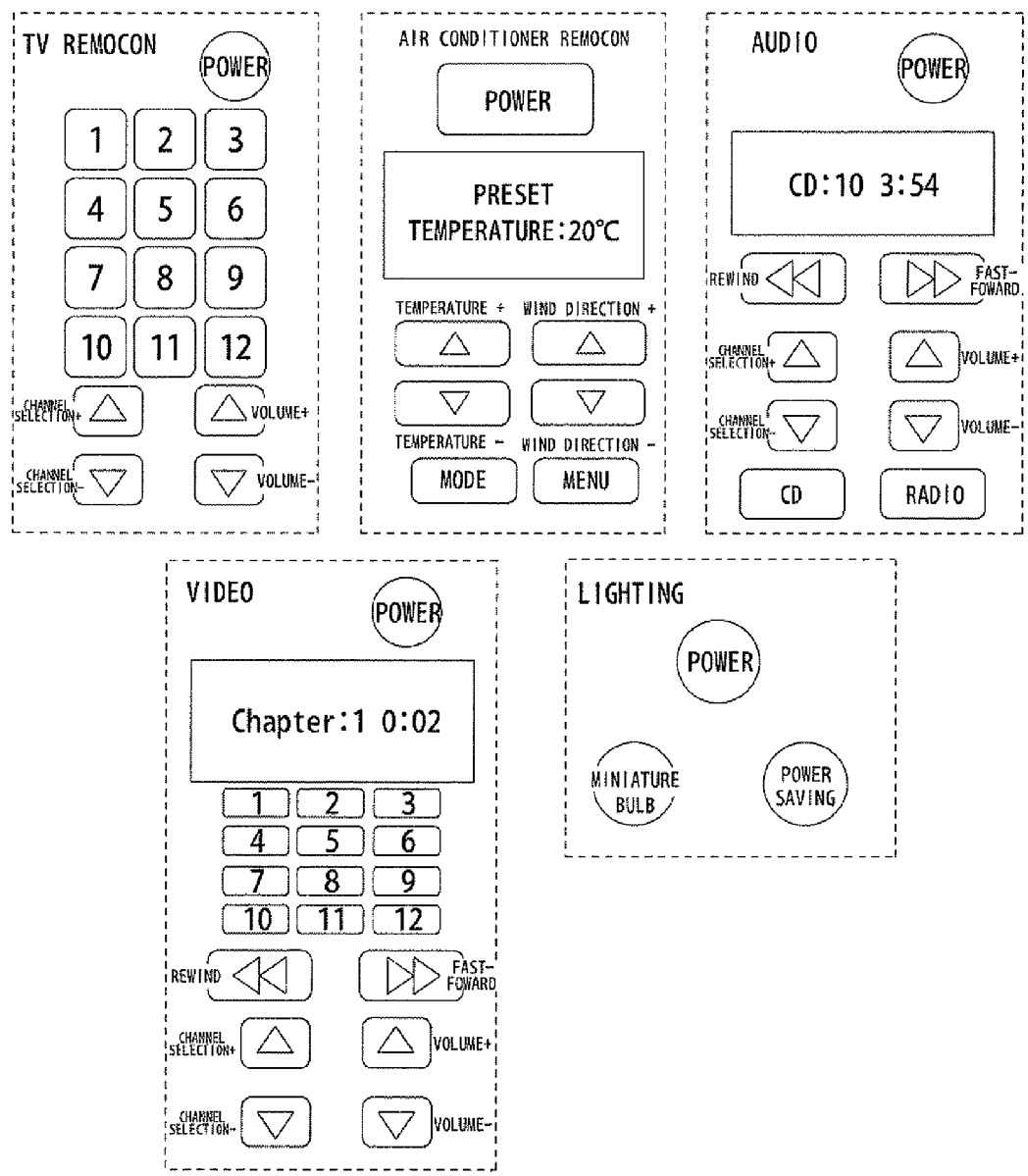
FIG. 4 is a diagram illustrating exemplary user interfaces of a variety of remocon applications, generated based on respective user interface definition files.

For example, FIG. 4 is a diagram illustrating exemplary UIs of a variety of remocon applications, generated based on user interface definition files shown in FIG. 2 and FIG. 3. If the UI definition file is described in a file format of UIML based on XML and a UI is generated by analyzing such UIML files, the UI for a single screen is generated to fit in the predetermined UI display area of the display unit 24. In the UI definition file of each UI, various attributes of the UI objects composing each UI are defined by the UI object definition information.

Such UI may be composed on the assumption of individual usage (that is, not assumed to be used as a compound UI). In this case, however, if the UI compound processing unit 60 performs the above processing to generate a compound UI, it is possible to generate a compound UI definition file for composing a single compound UI employing a plurality of UI objects selected by the user arbitrarily.

Next, a UI object reduction processing by the mobile phone 1 according to the first embodiment is described. According to the present embodiment, the UI object reduction processing is performed if the user selects desired UI objects from a plurality of UIs to generate the compound UI but the UI objects cannot be fit in a predetermined UI display area on the display unit 24.

Therefore, the UI object selection processing unit 62 first generates the UI object selection screen for receiving input to select UI objects by the user based on the UI object definition information and displays the screen on the display unit 24, as shown in FIG. 5(A). In an example shown in FIG. 5(A), desired UI objects can be selected from an air conditioner remocon UI, a TV remocon UI and a lighting remocon UI. In FIG. 5(A), a hatched checkbox indicates that the UI object thereof is selected. When UI objects are selected by input of the user touching the checkbox on the touch panel 20 (at the input unit 22) and the like, an occupancy accumulation unit (not shown) accumulates occupancies of the selected UI objects in the predetermined UI display area. In the example shown in FIG. 5(A), some UI objects are selected from the plurality of UIs by the user, and a bar chart at a lower section of the display unit 24 indicates that an accumulated occupancy of these UI objects is 85%.

When a plurality of UI objects are selected in this manner, the arrangement setting unit 71 of the automatic layout processing unit 70 virtually arranges the UI objects in accordance with a predetermined condition. If the user wishes to check arrangement of the UI objects visually, the user inputs to a soft key "Preview" shown at bottom right corner of the display unit 24 in FIG. 5(A), such that the UI object selection processing unit 62 displays a preview screen on the display unit 24 in response to the input as shown in FIG. 5(B). It is shown at the lower right of the UI display area that there is a vacant space of occupancy 15%, to which more UI objects can be added.

Here, as shown in FIG. 5(C), it is assumed that there is input to add a power button (power UI object) of the lighting remocon UI to the vacant space of 15% at the lower right of the UI display area. Since operability of UI object of the power button is deteriorated if the power UI object is located too close to other UI objects or the edge of the UI display area, an adequate space (margin) is set (as shown by dashed lines) around a spot of the power UI object to actually receive input. In this case, as shown in the figure, since a width of the power UI object cannot fit in the UI display area, the UI object cannot be arranged as it stands. Therefore, according to the present embodiment, if the arrangement availability determination unit 72 determines that the UI object cannot be arranged when the arrangement setting unit 71 tries to arrange the UI object, a warning message as shown in FIG. 5(D), for example, is displayed on the display unit 24 and the UI object reduction processing is performed according to the present embodiment.

That is, if there is input to select a UI object to the UI object selection screen generated by the UI object selection processing unit 62, the selection processing unit 71 virtually arranges the UI object. At this time, the arrangement availability determination unit 72 determines whether the UI object may fit in the predetermined UI display area when arranged, based on the UI object definition information of the UI object and the terminal-dependent information stored in the terminal-dependent information memory area 57. According to the present embodiment, the terminal-dependent information is related to display function of the display unit 24 to display the UI of the terminal. For example, the terminal-dependent information includes a size (dimension) of the UI display area to be displayed on the display unit 24, a screen resolution, a minimum displayable font size, a minimum line spacing of characters displayed and the like. The terminal-dependent information also includes information on the input device (whether the input device is the stylus or the finger).

If the UI object can be arranged as a result of determination by the arrangement availability determination unit 72, the automatic layout processing unit 70 determines to adopt the UI and includes the UI object definition information of the UI object in the compound UI definition file. However, if it is determined that the UI object cannot be arranged, the reducing object selection unit 73 selects the UI object, that is, a UI object selected last, as a target of the UI object reduction processing.

Next, the UI compound processing unit 60 performs the reduction processing on the UI object selected as the target. In the UI object reduction processing, a minimum display size of the UI object set by the minimum size setting unit 74 is used as a lower limit, so as to prevent deterioration of operability due to too much reduction. Setting processing of the minimum display size (lower limit) of the UI object by the minimum size setting unit 74 will be described below. If it is determined that the UI object to be add (power UI object, in this case) can fit in the predetermined UI display area if reduced with the minimum value set by the minimum size setting unit 74 as the lower limit, the automatic layout processing unit 70 rewrites size information included in the UI object definition information of the UI object and then includes the UI object definition information in the compound UI definition file.

For example, after displaying the warning message to reduce the power UI object of the lighting remocon UI to be added as shown in FIG. 5(D), occupancy of the power UI object of the lighting remocon UI is reduced from 10% to 7% as shown in the selection screen shown in FIG. 6(A). Thereby, the preview screen becomes as shown in FIG. 6(B), showing that the power UI object of the lighting remocon UI can fit in the UI display area by being reduced.

In addition, if it is desired to further add a UI object "Miniature Bulb" of the lighting remocon UI on the selection screen in FIG. 6(C), this UI object in its original size (occupancy 10%) cannot fit in the UI display area (occupancy 8% left). However, if occupancy of the UI object "Miniature Bulb" is reduced from 10% to 8% in the same manner as stated above, the UI object "Miniature Bulb" can fit in the UI display area as shown in the preview screen in FIG. 6(D).

Next, an operation to further add a UI object "Power Saving" of the lighting remocon UI on a selection screen shown in FIG. 7(A) is described. Since the accumulated occupancy is already 100% at stages shown in FIG. 6(C) and FIG. 6(D), this UI object "Power Saving" with occupancy 10%, as shown in FIG. 7(A), cannot be added as it stands, as shown in FIG. 7(B).

Therefore, the UI object selected last is reduced in the manner stated above. In this case, the UI object "Power Saving" selected last is reduced first. However, since the occupancy before reduction is already 100% as shown in FIG. 7(C), the UI object "Power Saving " cannot be added even if reduced down to the minimum display size (for example, occupancy 5%) set for maintaining operability of the UI object, as shown in FIG. 7(D).

Accordingly, in the UI object reduction processing according to the present embodiment, the reducing object selection unit 73 selects the UI object selected immediately before the UI object selected last, as a target of the next reduction processing. Next, the UI compound processing unit 60 performs the reduction processing on the UI object selected as the target, with a minimum display size of the UI object as a limit (lower limit).

A selection screen shown in FIG. 8(A) shows a state in which the UI object "Power Saving" selected last, and the previous UI object "Miniature Bulb", are selected as targets of the UI object reduction processing. The minimum display size (lower limit) set for the UI object "Miniature Bulb" is occupancy 5%, for example. However, as shown in a preview screen in FIG. 8(B), even if these two UI objects "Power Saving" and "Miniature Bulb" are reduced down to their lower limits, the accumulated occupancy still exceeds 100%, and thus the UI object "Power Saving" cannot be added.

Therefore, the reducing object selection unit 73 selects a second UI object selected before the UI object selected last, as a target of next reduction processing. The UI compound processing unit 60 performs the reduction processing on the selected UI object, with a minimum display size of the UI object as a limit (lower limit).

In the selection screen shown in FIG. 8(C), the UI object "Power Saving" of the lighting remocon UI selected last, the UI object "Miniature Bulb" selected immediately therebefore, and the UI object "Power" selected before the UI object "Miniature Bulb" are selected as targets of the UI object reduction processing. A minimum display size (lower limit) set for the UI object "Power" is occupancy 5%, for example. Then, as shown in the preview screen of FIG. 8(D), when these three UI objects "Saving Power", "Miniature Bulb" and "Power" are reduced down to the lower limits, the accumulated occupancy becomes 100%, which enables the UI object "Power Saving" to be added.

After this, the automatic layout processing unit 70 rewrites the size information included in the UI object definition information of these UI objects "Power Saving", "Miniature Bulb" and "Power" as stated above and then includes the UI object definition information in the compound UI definition file.

As set forth above, according to the present embodiment, when UI objects are selected and added, the UI object reduction processing is performed on the selected UI objects with a later selection order (from the UI object selected last), based on the order of selection by the user. This is based on a tendency that the UI object selected earlier is more important for the user and the UI object selected later is less important for the user.

Next, the setting processing of a minimum display size (lower limit) of the UI object by the minimum size setting unit 74 is described. When the UI object reduction processing is performed, it is necessary to set the minimum display size of the UI object so as to prevent the UI compound processing unit 60 from impairing operability by reducing the UI object too much.

Figure 9:
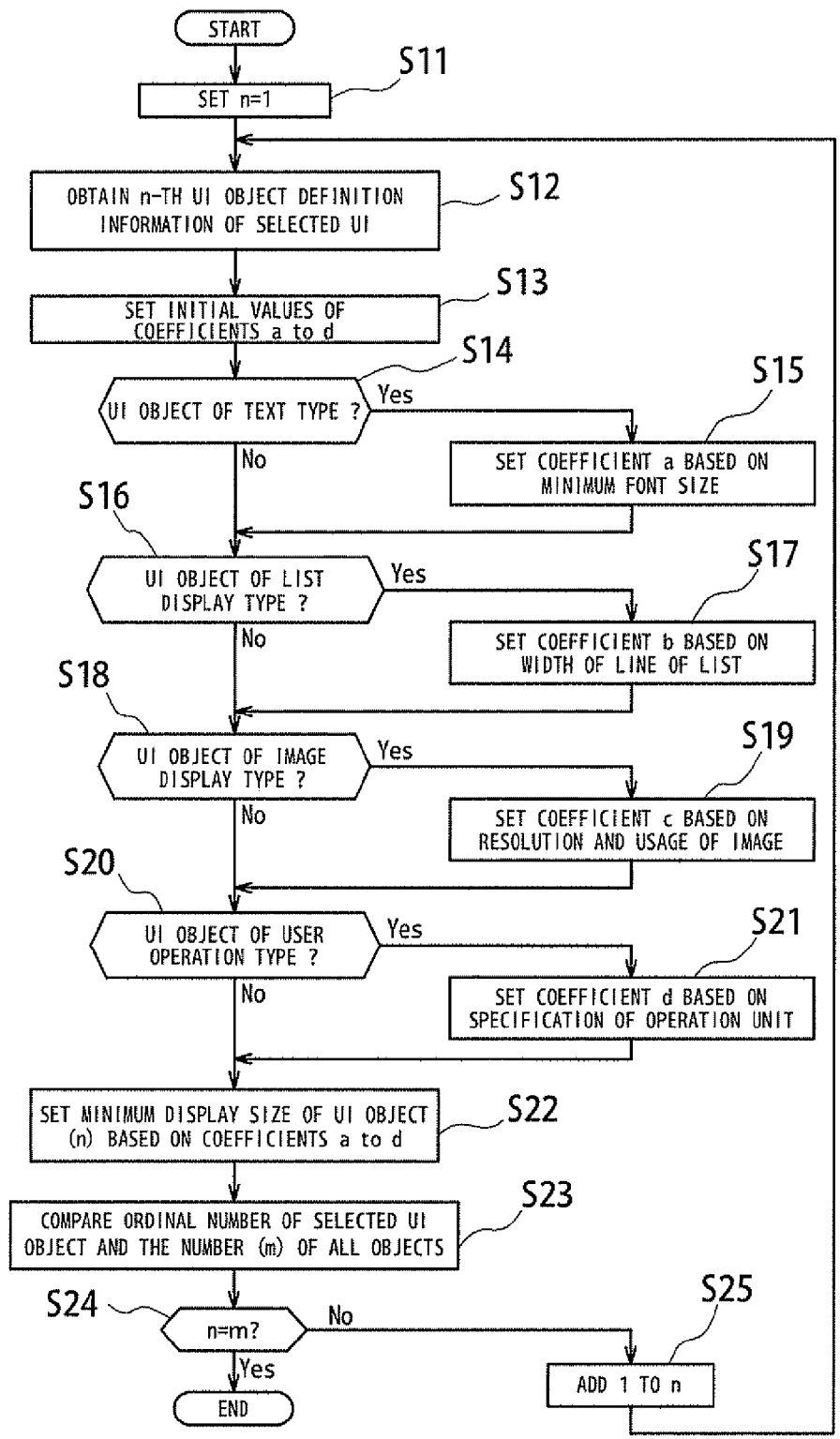
FIG. 9 is a flowchart illustrating setting processing of a minimum display size of a user interface object according to the first embodiment.

FIG. 9 is a flowchart illustrating the setting processing of the minimum display size (lower limit) of the UI object.

First, the UI object definition information analysis unit 61 counts the number (m) of the UI object definition information of UI objects included in the UI definition file, and the minimum size setting unit 74 sets n=1 as an initial value of the number n of the UI object definition information as a target of the lower limit setting (step S11).

Next, the minimum size setting unit 74 obtains UI object definition information at nth composing the UI selected to be compounded (step S12) and sets initial values of various coefficients a to d, indicating attribute of the UI object definition information at n-th obtained.

Then, the minimum size setting unit 74, based on information on various attribute included in the UI object definition information of the UI object at n-th and the terminal-dependent information stored in the terminal-dependent information memory are 57, updates the initial values of the coefficients to set new values of the coefficients, in accordance with a type of the UI object.

That is, if the UI object is of text type at step S14, the minimum size setting unit 74 sets the coefficient a based on a minimum font size and the like (step S15). For example, if the UI object includes a text indicating a function name on a key or a button, or if the UI object is a text box showing various information, the coefficient a is set in accordance with the terminal-dependent information, such as the minimum font size and the minimum line spacing displayable on the display unit 24 of the mobile phone 1, stored in the terminal-dependent information memory area 57.

In addition, if the UI object is of list display type at the step S16, the minimum size setting unit 74 sets the coefficient b based on a width of a line of the list and the like (step S17). For example, if the UI object is a list box to receive selection among items shown in a plurality of lines by the user, it is possible to reduce the number of lines to list the items by employing a scroll display for the items. In this case also, the coefficient b is set in accordance with the terminal-dependent information such as the minimum font size and the minimum line spacing displayable on the display unit 24 of the mobile phone 1.

Moreover, if the UI object is of image display type at step S18, the minimum size setting unit 74 sets the coefficient c based on resolution and usage of the image (step S19). For example, if based on the resolution of the image of the UI object, the minimum size setting unit 74 may set the coefficient c in accordance with the attribute information of the image included in the UI object definition information in addition to the terminal-dependent information. In addition, the usage of the image may be specified to some extent from information of a layer, included in the UI object definition information of image display type, to display the image on the display unit 24.

Furthermore, if the UI object is of user operation type such as a button or a checkbox at step S20, the minimum size setting unit 74 sets the coefficient d based on the specifications of the operation unit and the like (step S21). For example, if the UI object relates to input operation by the user such as key or button, the coefficient d is set in accordance with the terminal-dependent information such as a size of the UI display area of the display unit 24. In addition, the coefficient d is set in accordance with input device information such as finger input by the user or input with a dedicated input device such as the stylus, based on the specifications of the input unit 22. The input device information is included in the terminal-dependent information. Specifically, since an image displayed on an upper layer is likely to be used as UI object such as a key or button, the coefficient c is set so as not to reduce the image below a certain size. And, since an image displayed on lower layer is likely to be used as background image to be displayed as a ground on the display unit 24, the coefficient c is set so as to allow a high degree of freedom for reduction.

After completing to set the coefficients a to d, the minimum size setting unit 74 sets the minimum display size of the UI object based on each coefficient (step S22).

Thereafter, the minimum size setting unit 74 compares an ordinal number (n) of the n-th UI object and the number (m) of all UI objects (step S23) and, if they are the same number (Yes of step S24), ends the setting processing of the lower limit, as setting the lower limits to all UI objects is completed.

In contrast, if the ordinal number (n) of the UI object is not the same as the number (m) of all UI objects, that is, if the setting processing of the lower limits is not completed to all of the UI objects (No of step S24), the minimum size setting unit 74 adds 1 to n (step S25) and then returns to step S23 to continue the processing.

In the processing described above, two or more coefficients (a and d, for example) may be set for a UI object, such as key or button, for example, displaying a text overlapping the image.

The following is a further detailed description of the minimum size for reducing the UI object. As stated above, the minimum size for reducing each UI object may be set by various parameters.

FIG. 10 is a diagram illustrating lower limits for reducing UI objects classified by type of the UI objects, when the lower limits are set in accordance with the terminal-dependent information including the input device information when the user input with his/her finger. A standard size of a contact area on the input unit 22 of the touch panel 20 as shown in FIG. 10(A), touched by the operation device when the user operates the mobile phone 1, is hereinafter referred to as a "standard size". Since the standard size may differ for each user or for each operation device (finger or stylus), it is preferred to set each standard size to a predetermined value in advance, and to encourage the user to register each standard size when the user operates the mobile phone 1 for the first time and performs initial setting. When each standard size is registered, it is stored as the terminal-dependent information in the terminal-dependent information memory area 57 of the memory unit 50. A standard size when using a terminal attachment device such as the stylus as the operation device may be registered as the terminal-dependent information, in advance.

If the UI object as the reduction target is Button Widget (user operation type) as shown in FIG. 10(A) and displayed on the display unit 24, a size of the contact area of the input unit 22 which a user's index finger touches is defined as the standard size and, based on the standard size, the lower limit to reduce the object is set. When the reduction processing is performed on each UI object, a horizontal to vertical ratio is maintained, for example. In FIG. 10, a result of reducing each UI object, shown on the left, to the lower limit which can be set based on various conditions is shown on the right.

If the UI object as the reduction target is TextBox Widget (text type), the lower limit for reducing the object is set as shown in FIG. 10(B), based on a minimum font size displayable on the display unit 24 and a font size capable of securing visibility for the user when displayed on the display unit 24.

If the UI object as the reduction target is Image Widget (image display type), a predetermined reduction ratio is set as the lower limit based on usage of the image as shown in FIG. 10(C). If it is a wallpaper image, for example, the lower limit thereof is set as the entire UI display area set to each UI. In an example shown in FIG. 10(C), based on the entire arranging area of all UI objects included in the TV remocon UI, which is of the user operation type, surrounded by dashed lines, the image used as the wallpaper is reduced to have the same size as this area.

As set forth above, the lower limit for reducing each UI object is determined based on the terminal-dependent information for each type of the UI object. With the lower limit, it may prevent deterioration of operability and visibility of the UI object due to over-reduction thereof in the reduction processing.

FIG. 11 is a diagram illustrating lower limits for reducing UI objects classified by type of UI objects, when the lower limits are set in accordance with the terminal-dependent information including the input device information when the user inputs with the stylus.

If the UI object as the reduction target is Button Widget (user operation type), when the UI object is displayed on the display unit 24 as shown in FIG. 11(A), a size of the contact area of the input unit 22 which the stylus touches is defined as the standard size and, based on this standard size, the lower limit to reduce each object is set. If the UI object as the reduction target is Button Widget (user operation type) as shown in FIG. 11(A), a smaller lower limit than that of when the user inputs with his/her finger as shown in FIG. 10(A) may be set. This is because input with the stylus enables input operation finer than finger operation. In FIG. 11, a result of reducing each UI object, shown on the left, to the lower limit which can be set based on various conditions is shown on the right.

As shown in FIGS. 11(B) and (C), if the UI object as the reduction target is TextBox Widget (text type) or Image Widget (image display type), the lower limit same as those shown in FIGS. 10(B) and (C) can be set.

Figure 12:
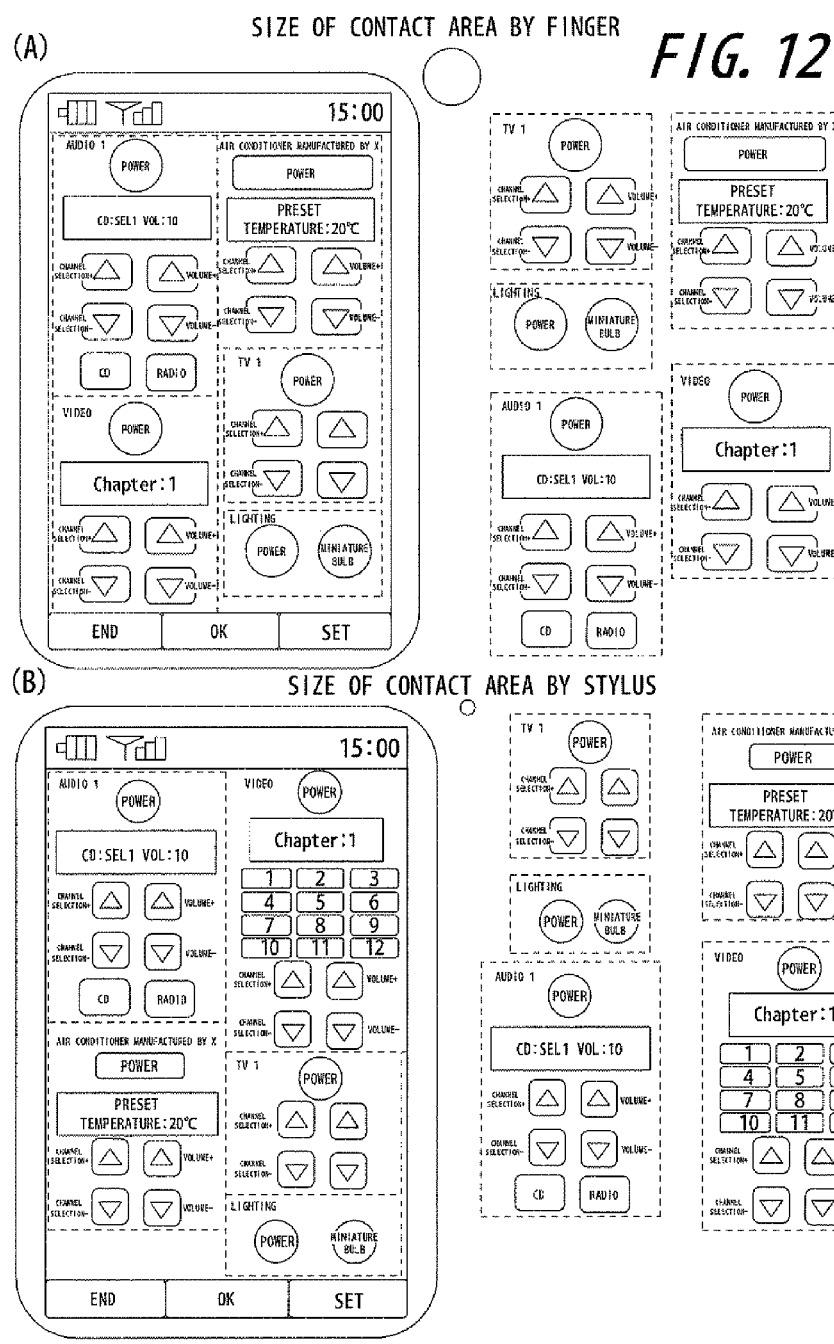
FIG. 12 is a diagram illustrating that the user interface objects, which can be arranged when a compound user interface is displayed, are changed depending on the operation device.

FIG. 12 is a diagram illustrating exemplary compound of a plurality of UIs when multiple main UI objects are selected and arranged in basic arrangements of those UIs. FIG. 12(A) shows a display screen of the compound UI generated by compounding a plurality of UIs based on the lower limits of reduction set using the size of the contact area when the user inputs with his/her finger as the standard size. Meanwhile, FIG. 12(B) shows a display screen of the compound UI generated by compounding a plurality of UIs based on the lower limits of reduction set using the size of the contact area when the user inputs with the stylus as the standard size. As obvious from a comparison of FIGS. 12(A) and (B), since the lower limits of the UI objects can be set smaller when input is performed with the stylus, it enables more UI objects to be arranged.

As set forth above, according to the present embodiment, a variety of compound UI composed of only UI objects arbitrarily selected by the user may be generated. When the compound UI is generated based on selection by the user, the compound UI definition file generation unit 63 generates the compound UI definition file corresponding to the compound UI generated. The UI compound processing unit 60 stores the compound UI definition file generated, in the compound UI definition file memory area 56. Thereafter, by reading out the compound UI definition file stored in the compound UI definition file memory area 56, the UI generation unit 13 can reproduce the compound UI newly generated, on the display unit 24 of the touch panel 20.

Next, a UI re-compound processing accompanying change of the operation device according to the present embodiment is described. This processing is to re-compound the compound UI being used, when the operation device for input operation employed by the user is changed, based on an operation device after such change.

Figure 13:
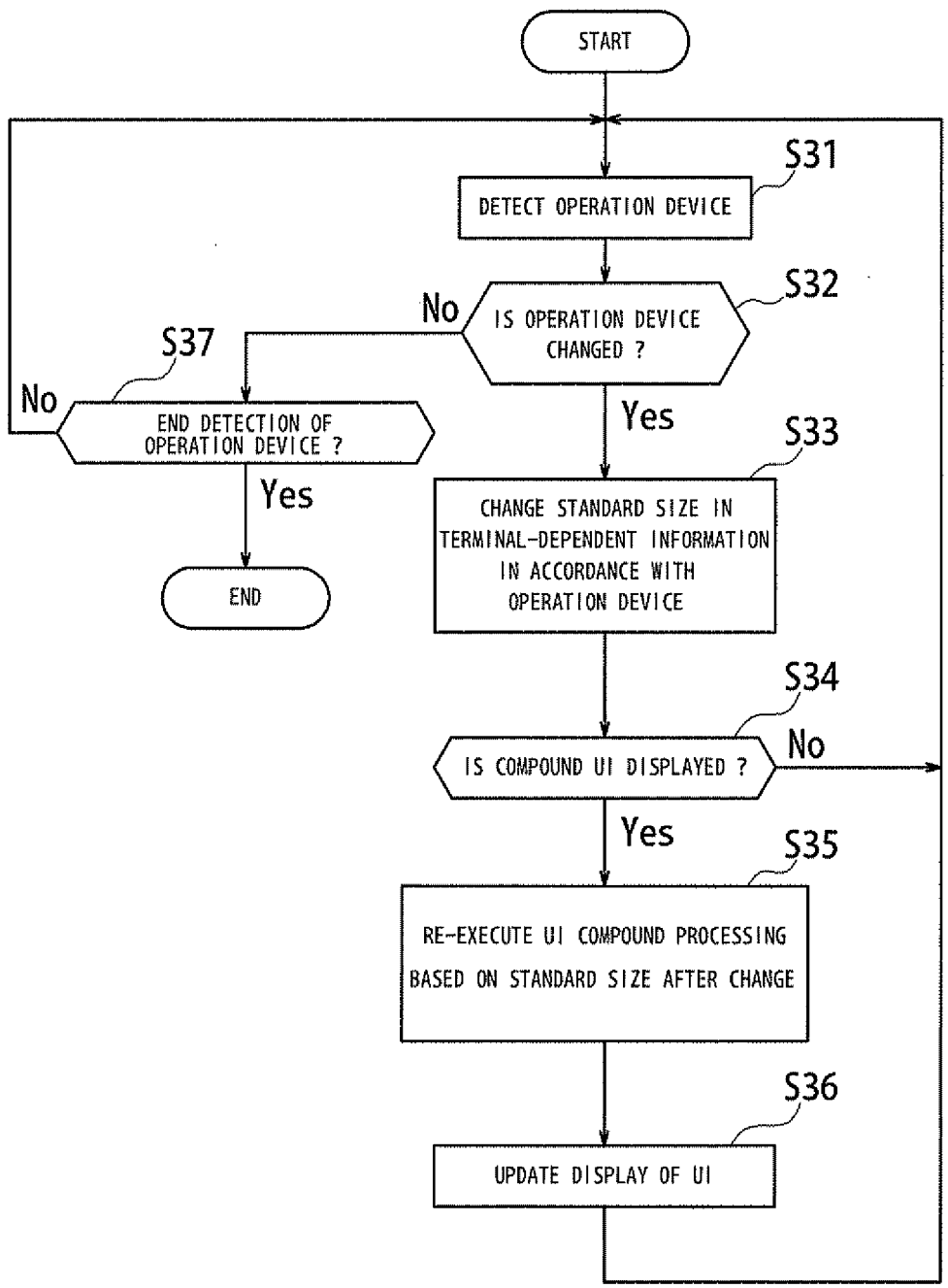
FIG. 13 is a flowchart illustrating a UI re-compound processing accompanying change of the operation device according to the first embodiment.

The following is a description of the UI re-compound processing accompanying change of the operation device according to the present embodiment with reference to a flowchart shown in FIG. 13.

After starting a mode to detect change of the operation device (hereinafter, referred to as an "operation device detection mode"), the operation device detection unit 14 of the control unit 10 detects the operation device used by the user to input operation (step S31). That is, the operation device detection unit 14 monitors input from the input unit 22 of the touch panel 20, the operation key unit 80 and the stylus storage unit 90, to detect input from each of these function units. When detects input, the operation device detection unit 14 determines whether the operation device is changed, based on the input (step S32).

For example, if input from the touch panel 20 is detected while input has been detected from the operation key unit 80 therebefore, the operation device detection unit 14 determines that the operation device is changed from the operation key unit 80 to the touch panel 20.

In addition, if the contact area of input to the input unit 22 of the touch panel 20 changes to be larger than a predetermined value, the operation device detection unit 14 determines that the operation device changes from the stylus to the "finger". In contrast, if the contact area of input to the input unit 22 of the touch panel 20 changes to be smaller than a predetermined value, the operation device detection unit 14 determines that the operation device changes from the finger to the stylus.

Moreover, if it is detected that the stylus is taken out of the stylus storage unit 90, the operation device detection unit 14 determines that operation will be performed with the stylus on the touch panel 20 thereafter. In contrast, if it is detected that the stylus is stored in the stylus storage unit 90, the operation device detection unit 14 determines that operation will be performed with the finger on the touch panel 20 or at the operation key unit 80 thereafter.

As stated above, if it is determined that the operation device is changed at step S32, the UI compound processing unit 60 changes the standard size stored as the terminal-dependent information in the terminal-dependent information memory area 57, in accordance with the operation device detected (step S33). For example, if the operation device changes to the "finger", the standard size is changed to the size based on the contact area of the "finger". Similarly, if the operation device changes to the stylus, the standard size is changed to the size based on the contact area of a tip of the stylus.

Next, the control unit 10 determines whether the UI being displayed on the display unit 24 of the touch panel 20 is the compound UI generated based on the compound UI definition file (step S34). If the UI being displayed on the display unit 24 is not the compound UI (that is, the UI assumed to be used alone), change of the size of each UI object of such UI has no effect on the UI objects composing other UIs. That is, even if the re-compound processing is performed on the UI being displayed, there is no change in configuration of the UI itself. Therefore, in such a case, without performing change (re-compound) processing on the UI, the control unit 10 returns to step S31.

In contrast, if the UI displayed on the display unit 24 is the compound UI at step S34, the UI compound processing unit 60 performs the UI compound processing again on each UI object included in the compound UI definition file of the compound UI, based on the standard size changed at step S33 (step S35). Then, the UI generation unit 13 displays each UI object on which the UI compound processing is performed again on the display unit 24, so as to update display of the UI (step S36). After that, the process flow returns to step S31 to detect next change of the operation device.

If the operation device is not changed at step S32, it is determined whether detection of change of the operation device is finished, that is, whether the operation device detection mode is finished (step S37). If the operation device detection mode is not finished yet, the process flow returns to step S31 to detect next change of the operation device. If it is detected at step S37 that the operation device detection mode is finished at step S37, the UI re-compound processing accompanying change of the operation device is finished. Accordingly, the operation device detection unit 14 constitutes an operation input device determination unit according to the present embodiment.

Thereby, if the operation device for input operation by the user is changed, the mobile phone 1 determines a new operation device and provides the user with an optimum compound UI corresponding to each operation device. If the stylus is taken out of the stylus storage unit 90 while the compound UI as shown in FIG. 12(A) is displayed on the display unit 24 of the touch panel 20, the compound UI is re-compounded and the screen changes to display of the compound UI as shown in FIG. 12(B). That is, more UI objects in smaller sizes are displayed for operation with the stylus, than those for operation with the finger. Then, when the stylus is stored in the stylus storage unit 90, the screen returns to the compound UI as shown in FIG. 12(A), which is suitable for operation with the finger.

In addition, even after the stylus is taken out and the screen changes to the compound UI as shown in FIG. 12(B), when a finger touches the touch panel 20 for input operation without using the stylus, the screen can switch to the compound UI as shown in FIG. 12(A) based on the contact area (standard size) of the finger. Then, the screen may change to the compound UI as shown in FIG. 12(B) when the stylus touches the touch panel 20.

In addition, it is also possible to switch the compound UI to be displayed on the display unit 24 to a compound UI for operation with the operation keys (that is, not for operation with the touch panel), based on operation to press each key constituting the operation key unit 80. Moreover, it is also possible to display a compound UI suitable for operation with the pointer displayed on the display unit 24 when the pointer is displayed to specify input spot on the display unit 24. If the terminal can customize an image of the pointer, it is possible to calculate a standard size based on a size of the image of the pointer to be displayed and display the compound UI in accordance with the standard size.

(Second Embodiment)

Next, a UI object reduction processing according to a second embodiment of the present invention is described.

According to the present embodiment, if UI objects cannot fit in the predetermined UI display area on the display unit 24 in generating a compound UI by automatically selecting and arranging the UI objects, the reduction processing is performed on the UI objects selectively.

Figure 14:
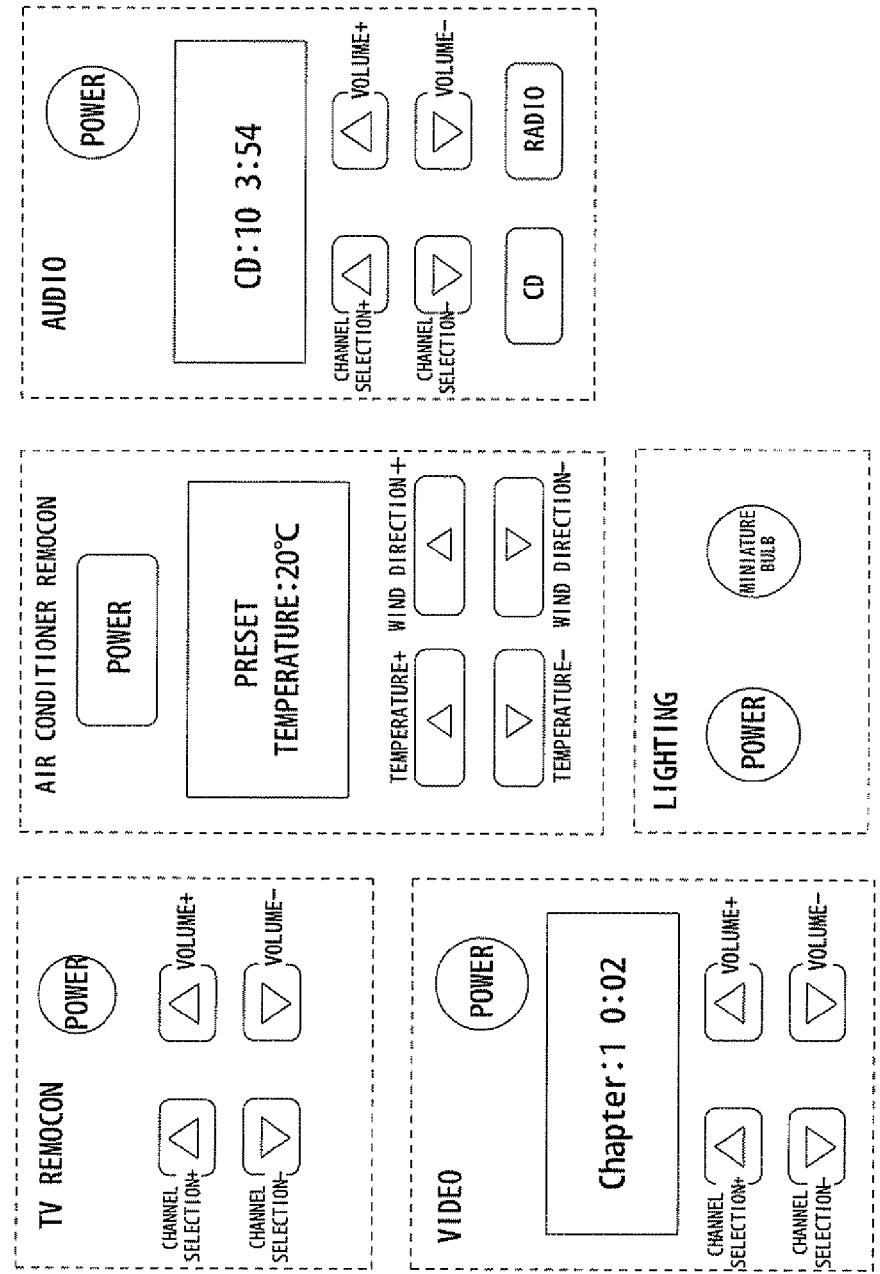
FIG. 14 is a diagram illustrating user interfaces composed of high priority user interface objects used for automatic compound of the user interfaces according to a second embodiment.

FIG. 14 is a diagram illustrating UIs composed of the UI objects with high priority used for automatic compound of the UIs. These UI objects composing each UI are necessary when each UI instructs execution of basic and important functions based on a corresponding application.

As described in the first embodiment, the UI definition file corresponding to each UI includes the UI object definition information of all UI objects. In addition, the UI object definition information included in the UI definition file of each UI includes "priority order information" of (7) described above, which indicates what priority each UI object has in the UI.

The priority order information indicates whether each UI object composing the UI, when a plurality of UIs are compounded automatically, should be always selected as an essential UI object, is preferably selected as an important UI object, or has lower importance comparing to other UI objects and thus can be omitted according to conditions. Each UI shown in FIG. 14 extracts the essential UI objects and UI objects with high priority based on the UI object definition information included in each UI definition file. Thus, the UI objects which should be selected when each UI is compounded are defined in advance.

In addition, in order to specify the UI object which should be selected when the UI objects are automatically selected and arranged, a predetermined threshold of the priority order is included in the priority order information. Thereby, the UI object with the priority order in the threshold is always selected. The priority order information included in the UI object definition information of the essential UI object is hereinafter referred to as "essentiality information".

Figure 15:
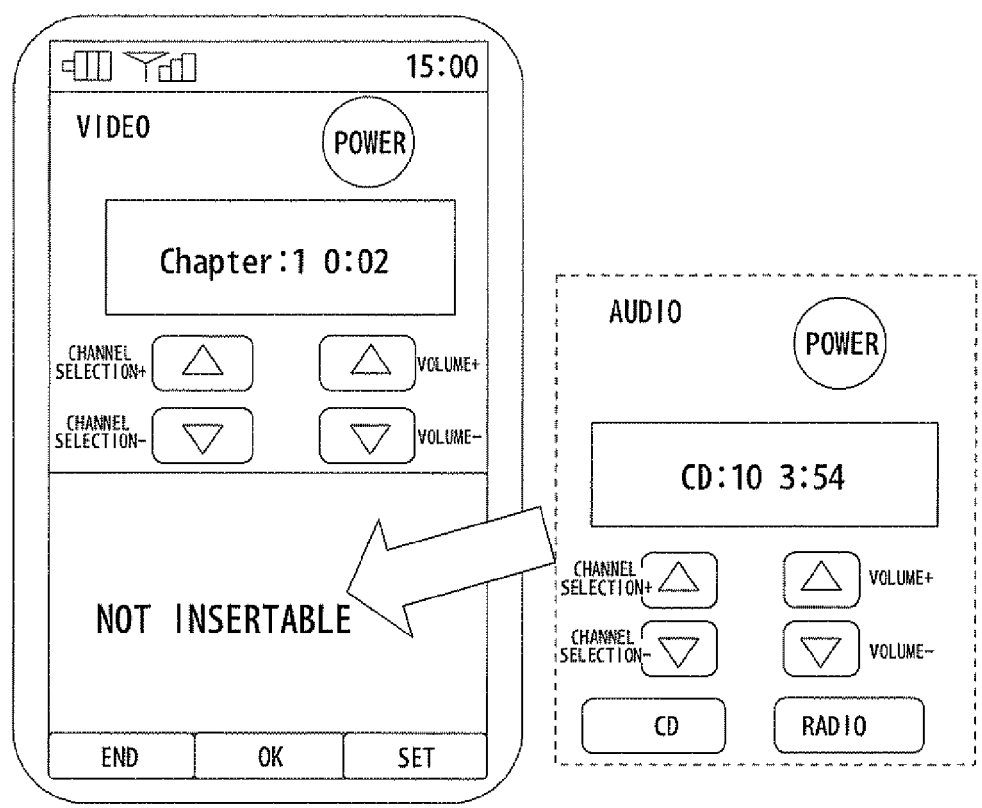
FIG. 15 is a diagram illustrating that each user interface cannot be compounded as it stands in automatic compound of the user interface according to the second embodiment.

The following is a description about automatic layout processing when a video remocon UI and an audio remocon UI among the UIs shown in FIG. 14 are automatically compounded, as an example. When it is attempted to select the audio remocon UI after selecting the video remocon UI shown in FIG. 14 so as to compound them, these two UIs as they stand cannot fit in the UI display area of the display unit 24, as shown in FIG. 15. In such a case, according to the present embodiment, the UI objects are reduced selectively in accordance with a predetermined condition.

Figure 16:
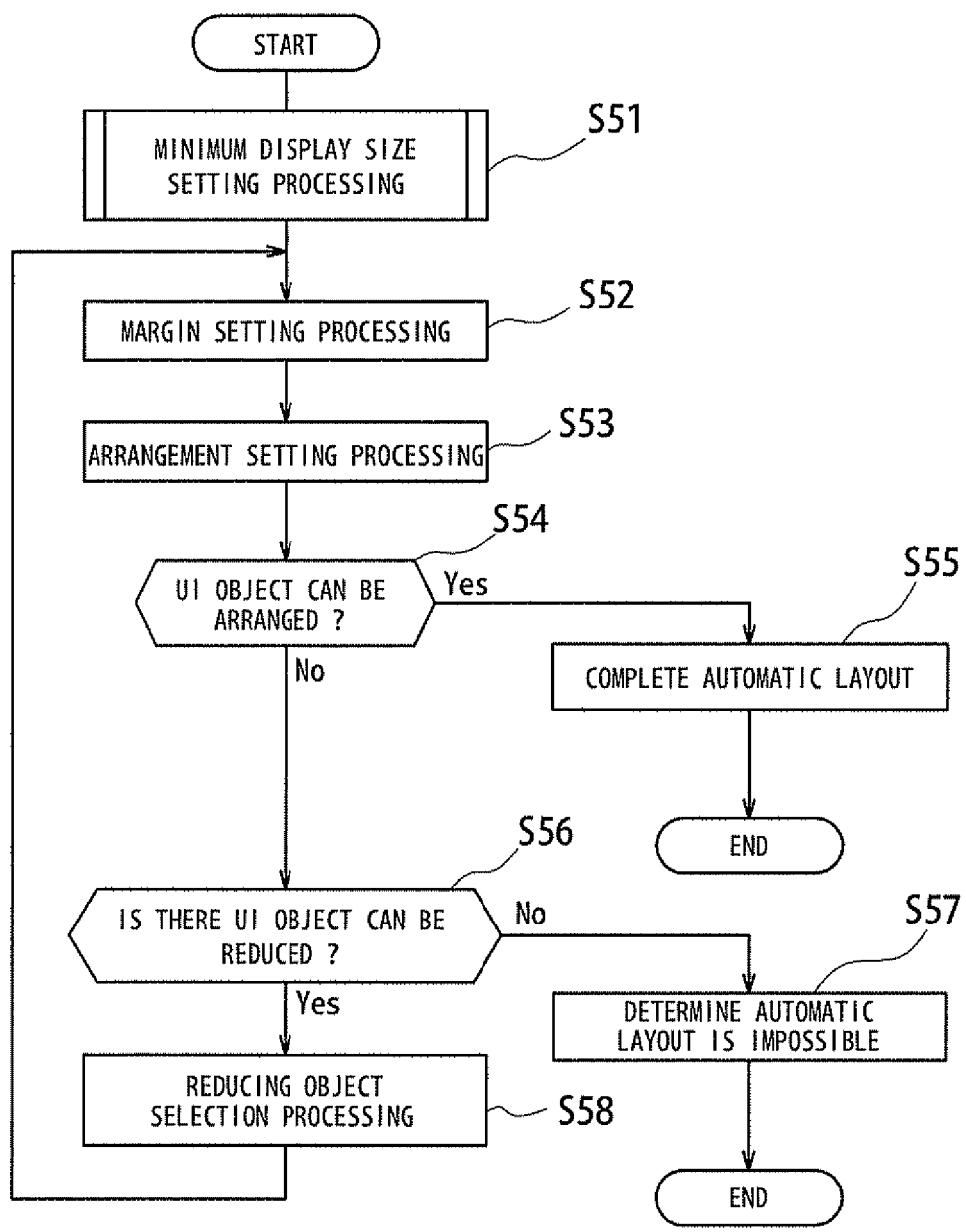
FIG. 16 is a flowchart illustrating an automatic layout processing according to the second embodiment.

FIG. 16 is a flowchart illustrating the automatic layout processing according to the present embodiment. When the automatic layout processing starts, the minimum size setting unit 74 performs the setting processing of the minimum display size on each UI object included in a plurality of selected UIs, as described in the first embodiment (see FIG. 9) (step S51). Thereby, a lower limit used when the display size of each UI object is reduced is set.

Next, the margin setting unit (not shown) included in the arrangement setting unit 71 performs the margin setting processing on each UI object to set a necessary margin (space) from a UI object nearby in arranging the UI object (step S52). In this processing, the UI object definition information analysis unit 61 analyzes "relationship information between the UI object and other UI objects" in the (8) stated above included in the UI object definition information of each selected UI object. The margin setting processing prevents the UI objects from being arranged too close to one another and thus prevents deterioration of operability for the user.

Next, the arrangement setting unit 71 performs the arrangement setting processing to virtually arrange each UI object based on a default display size information included in the UI object definition information and the margin set by the margin setting processing at step S52 (step S53). In the arrangement setting processing, the arrangement setting unit 71 arranges the UI objects, included in the same UI definition file, close to one another. In addition, the arrangement setting unit 71 arranges the UI objects, highly related to one another among the UI objects included in the same UI definition file, close to one another reflecting relative positions thereof, based on the relationship information between the UI object and other UI objects in the above (8).

When the arrangement setting processing at step S53 is completed, the arrangement availability determination unit 72 determines whether all of the UI objects of the compound UI can be arranged within the UI display area based on virtual arrangement of the UI objects by the arrangement setting processing (step S54). If it is determined that all of the UI objects can be arranged (Yes of step S54), the automatic layout processing unit 70 actually displays the UI objects, virtually arranged, on the display unit 24 (step S55) and thereby completes the automatic layout processing.

On the other hand, if it is determined that all of the UI objects of the compound UI cannot be arranged so as to fit in the predetermined UI display area, the reducing object selection unit 73 determines whether there is a UI object which can be reduced, based on a result of the minimum display size setting processing at step S51 (step S56).

If it is determined that there is no UI object which can be reduced at step 556, the automatic layout processing unit 70 determines that automatic layout is impossible (step S57) and finishes the automatic layout processing. At this time, the automatic layout processing unit 70 may display accordingly on the display unit 24. In addition, it is preferred in this case to require the user to reselect UI objects to be arranged or reselect UIs to be compounded. Thereby, it is possible to prevent forcible compound of the UIs which sacrifices operability.

If it is determined at step S56 that there is a UI object which can be reduced, the automatic layout processing unit 70 selects and reduces the UI object, which is selected as the one whose display size should be reduced preferentially by the reducing object selection unit 73 (step S58). In this case, the reduction processing is performed based on the minimum display size set at step S51.

According to the present embodiment, the selection processing of the UI objects which should be reduced at step S58 is performed based on the priority set for each UI object. That is, based on the priority order information included in the UI object definition information of each UI object, the UI object with a low priority order is determined as less important and thus selected as the UI object which should be reduced preferentially.

FIG. 17(A) is a diagram illustrating UI objects, composing the video remocon UI and the audio remocon UI to be compound, categorized according to the priority order. In the figure, the UI object (UI object "Power") with priority order (Priority) Hi means that it has high priority, whereas the UI object with priority order Low means that it has low priority. In an example shown in the figure, it is set not to use the UI object with priority order Low when the video remocon UI and the audio remocon UI are compounded, thereby being excluded from available choices of the objects to be reduced. Thus, according to the present embodiment, the UI objects with priority order information (priority) Hi, Middle1 and Middle2 are essential UI objects and the priority order information of these UI objects included in the UI object definition information is "essentiality information".

FIG. 17(B) is a diagram illustrating the UI objects with low priority reduced based on the selection processing of the UI objects which should be reduced. An example shown in the figure illustrates a state in which, for both of the video remocon UI and the audio remocon UI, the UI objects with priority order (Priority) HI and Middle1 are excluded from reduction and the UI objects with priority order Middle2 are reduced as targets for reduction. The UI objects with priority order Middle 2, information display window and buttons "radio" and "CD" of the audio remocon UI, are reduced. The reduction processing in this case is performed with the minimum display size set at step S51 as a limit.

After completing selection and reduction of UI objects at step S58, the process flow returns to step S52. Thereafter, the margin setting processing at step S52 and the arrangement setting processing at step S53 are performed on the UI objects including the UI objects reduced. Such processing stated above is performed until it is determined that the compound UI fits in the UI display area on one screen or that the compound UI cannot be generated.

Figure 18:
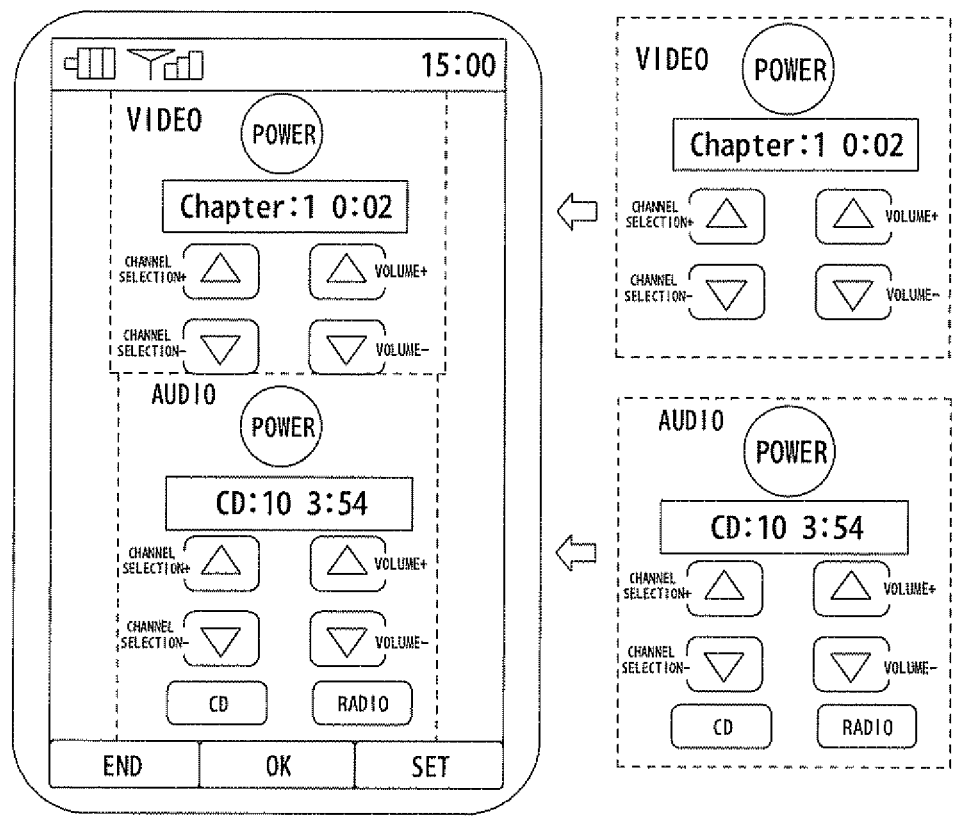
FIG. 18 is a diagram illustrating an example when the user interfaces are compounded with the reduction processing according to the second embodiment.

Since the UI objects are arranged after the selection processing and the reduction processing as stated above, two UIs which cannot be compounded in FIG. 15 can be fit in the UI display area of the display unit 24 as a single screen as shown in FIG. 18. In addition, when the UI object is reduced in compounding the UIs, the reduction processing exceeding the minimum display size is not performed. It is thus possible to automatically layout the UI objects while maintaining usability.

However, there may be a case in which the compound UI cannot fit in the UI display area of one screen just by reducing the UI objects with the priority order Middle2 shown in FIG. 17. In this case, it is possible to perform the UI compound processing by repeating the reduction processing and the (virtual) arrangement setting processing in series, such as to reduce the UI objects with the priority Middle1 as well.

(Third Embodiment)

Next, the reduction processing of the UI object according to a third embodiment is described.

According to the third embodiment, the selection processing of the UI objects which should be reduced is modified from that at step S58 in the second embodiment described with reference to FIG. 16. Since other operations are the same as those in the second embodiment, descriptions thereof are omitted.

According to the present embodiment, the selection processing of the UI objects which should be reduced at step S58 is performed based on the priority determined by type of the UI objects. That is, based on type information of the UI object included in the UI object definition information of each UI object, the UI object of a type with low priority is selected as the UI object which should be reduced preferentially, in accordance with the priority determined in advance by type of UI object.

FIG. 19(A) is a diagram illustrating UI objects, composing the video remocon UI and the audio remocon UI to be compound, categorized according to type of the UI objects. In the figure, the UI objects are categorized according to their type (type of Widget) into two kinds of UI objects: the user operation type UI object (Button Widget) and the text type UI object (TextBox Widget).

FIG. 19(B) is a diagram illustrating an example in which the UI objects of text type (TextBox Widget) have higher priority order than the UI objects of user operation type (Button Widget) and thus the UI objects (Button Widget) with low priority order are reduced. For example, if input is performed with the stylus, it is possible to set priority order of the UI objects of user operation type (Button Widget) low as shown in FIG. 19(B), so as to arrange more UI objects. It is also possible, if desired, to set the priority order of the UI object of user operation type higher.

Figure 20:
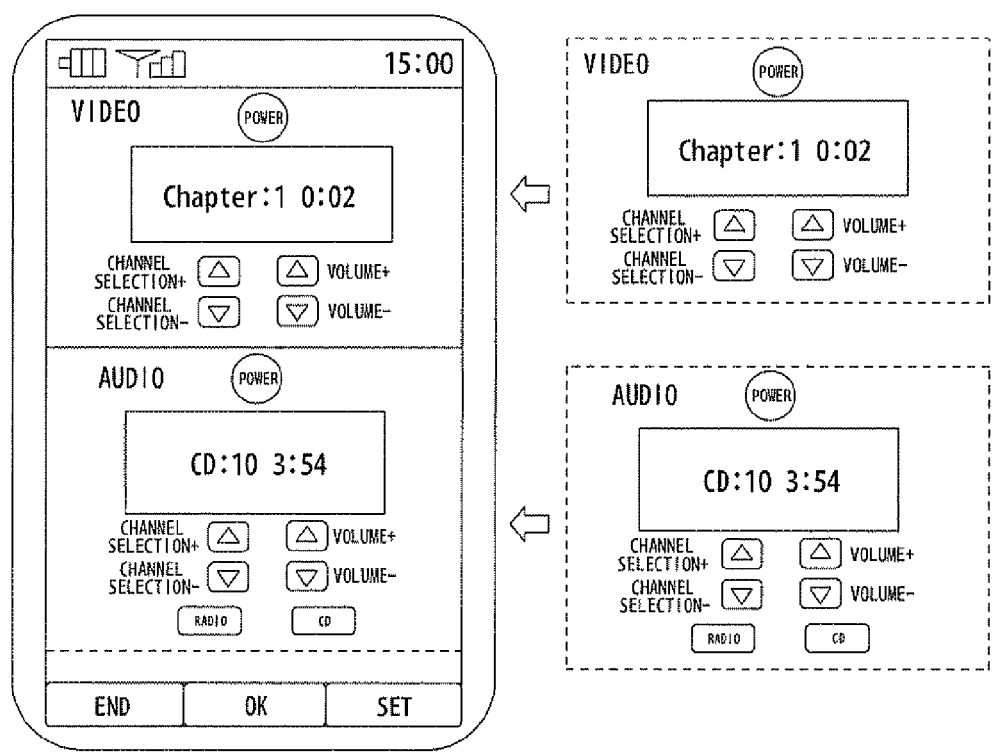
FIG. 20 is a diagram illustrating an example when the user interfaces are compounded with the reduction processing according to the third embodiment.

Accordingly, it is possible to fit two UIs, which cannot be compounded before the reduction processing, as one screen in the UI display area of the display unit 24 as shown in FIG. 20, for example, by selecting the UI objects of the type with low priority order as the UI object which should be reduced preferentially and performing the reduction processing on the UI objects, as stated above.

(Fourth Embodiment)

Next, the reduction processing of the UI object according to a fourth embodiment is described.

According to the fourth embodiment, similarly to the third embodiment, the selection processing of the UI objects which should be reduced is modified from that at step S58 in the second embodiment.

According to the present embodiment, the selection processing of the UI objects which should be reduced at step S58 is performed based on the priority determined for each UI. That is, the UI objects of each UI defined by the same UI definition file are grouped and, based on the priority order determined for each group, the UI objects in a group with low priority are selected as the UI objects which should be reduced preferentially.

FIG. 21(A) is a diagram illustrating the UI objects, composing the video remocon UI or the audio remocon UI which are to be compounded, categorized into respective UIs. In the figure, the UI objects are categorized into two groups; the UI object composing the video remocon UI and the UI object composing the audio remocon UI.

In an example shown in FIG. 21(A), the UI objects composing the video remocon UI have high priority order and the UI objects composing the audio remocon UI have low priority order. In this manner, the UI objects are grouped into each UI to which a priority order is given, and the UI objects of the UI with low priority are selected as the UI objects to be reduced.

Figure 22:
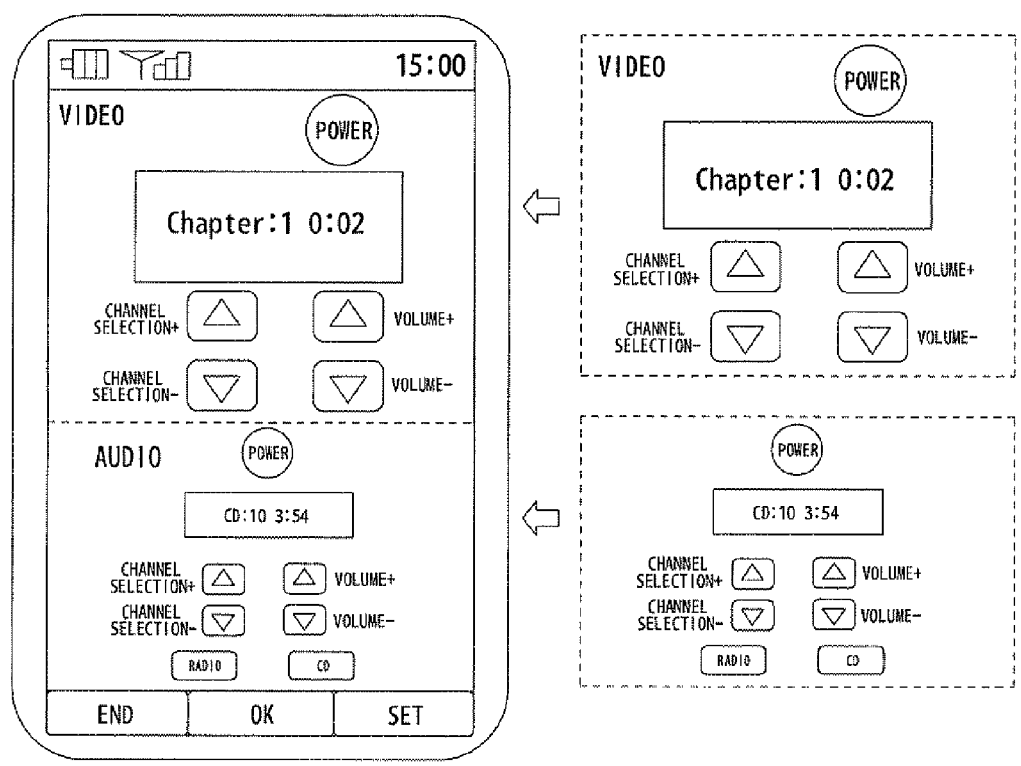
FIG. 22 is a diagram illustrating an example when the user interfaces are compounded with the reduction processing according to the fourth embodiment.

FIG. 21(B) is a diagram illustrating an example in which the reduction processing is performed on each UI object composing the audio remocon UI with low priority order. Accordingly, it is possible to fit two UIs, which cannot be compounded before the reduction processing, as one screen in the UI display area of the display unit 24, as shown in FIG. 22, for example, by selecting the UI objects of the UI with low priority as the UI objects which should be reduced preferentially and performing the reduction processing on the UI objects, as stated above.

(Fifth Embodiment)

Next, the reduction processing of the UI object according to a fifth embodiment is described.

According to the fifth embodiment, similarly to the third and the fourth embodiments, the selection processing of the UI objects which should be reduced is modified from that at step S58 in the second embodiment.

According to the present embodiment, the selection processing of the UI objects which should be reduced at step S58 is performed based on the priority determined based on a difference between a current occupancy of each UI object and a occupancy of the UI object reduced to the lower limit. That is, based on a difference between a current display size of each UI object and a display size of the UI object reduced based on the lower limit set by the minimum display size setting processing, the UI object with larger difference is selected as the UI object which should be reduced preferentially. This is based on a tendency that the UI object with a large difference in its size before reduced and after reduced to the lower limit does not normally deteriorate operability even reduced to the lower limit and provides more vacant space in the UI displayed area when reduced.

Figure 23:
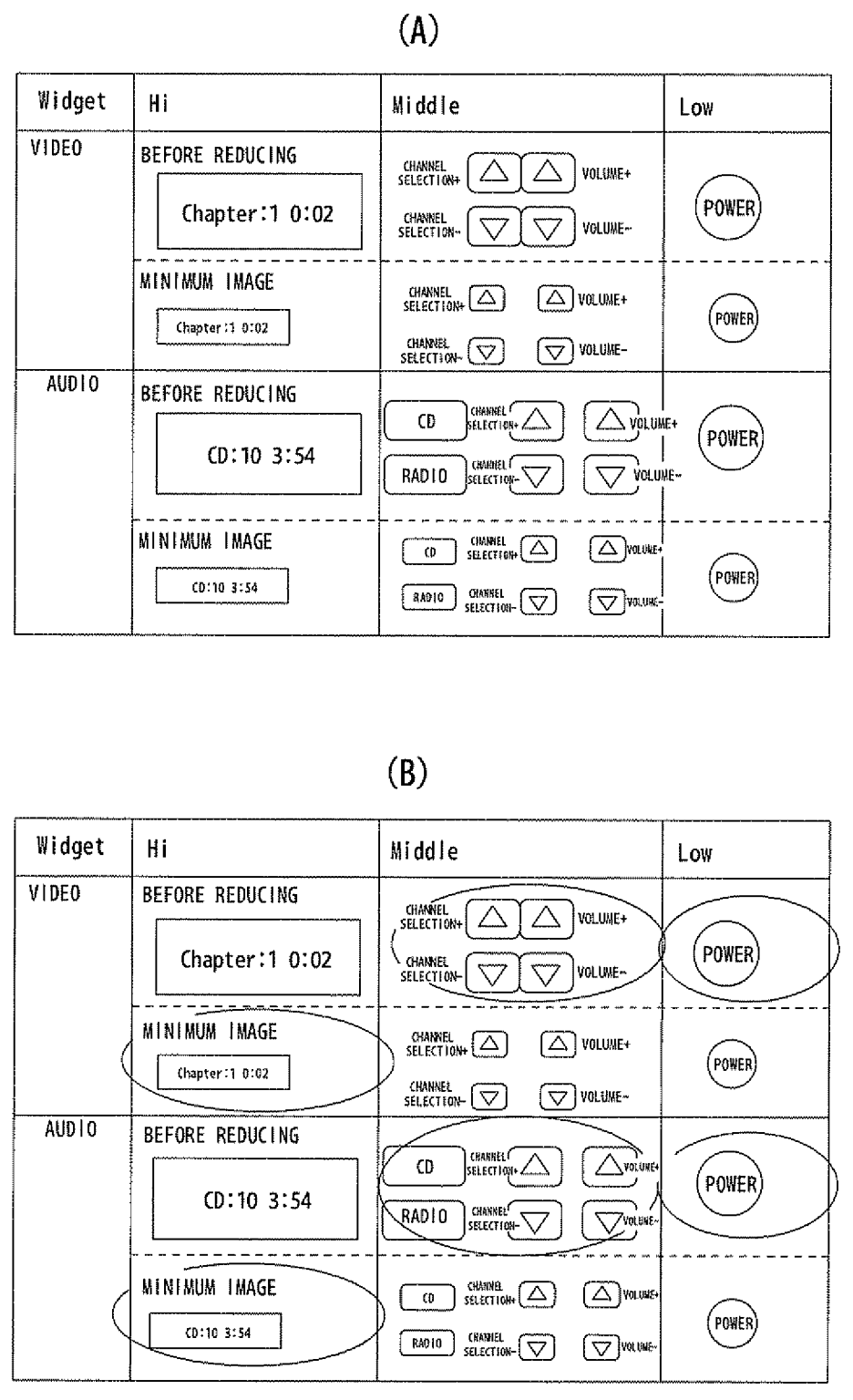

FIG. 23(A) is a diagram illustrating UI objects, composing the video remocon UI or the audio remocon UI which are to be compounded, categorized based on the difference in its size before and after being reduced to the lower limit. In an example in the figure, the UI objects of text type (TextBox Widget) of both of the UIs are categorized into "Large" difference in size between before and after being reduced. In addition, the UI objects (Button Widget) of user operation type of both of the UIs are categorized into "Medium" or "Small" difference in size between before and after being reduced.

As shown in FIG. 23(B), for example, based on categorization as described above, the UI objects with larger difference in its size between before and after being reduced to the lower limit are selected preferentially and reduced by the reduction processing. In FIG. 23(B), ellipses show that the UI objects after being reduced are adopted for the UI objects with the difference "Large", whereas the UI objects before being reduced are adopted for the UI objects with the difference "Medium" or "Small", as the reduction provides little difference.

Figure 24:
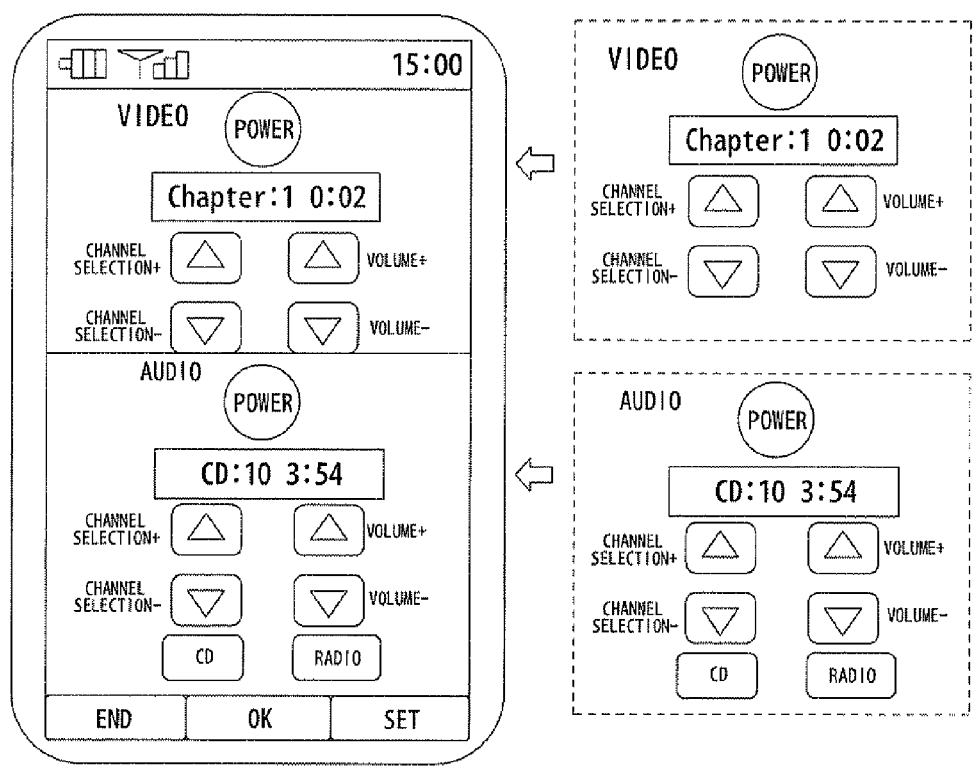
FIG. 24 is a diagram illustrating an example when the user interfaces are compounded with the reduction processing according to the fifth embodiment.

Accordingly, it is possible to fit two UIs, which cannot be compounded before the reduction processing, as one screen in the UI display area of the display unit 24, as shown in FIG. 24, for example, by selecting the UI objects with large difference in sizes before and after being reduced as the UI objects which should be reduced preferentially and performing the reduction processing on the UI objects, as stated above, It is to be understood that the present invention is not limited to the embodiments set forth above but may be modified or varied in a multiple manner. For example, the mobile terminal having the touch panel executes the UI compound processing in the above embodiments. However, the touch panel is not an essential element for the UI compound processing according to the present invention. The present invention may be applicable to a terminal with any input unit, such as numerous mechanical keys, for example, with which a user may compound UIs.

In the above first embodiment, the mobile terminal 1 performs the UI re-compound processing accompanying change of the operation device when being in the operation device detection mode, for convenience of description. However, the mobile phone 1 may always operate in this mode. In addition, it is assumed in the first embodiment that the user selects desired UI objects from a plurality of UIs to generate a compound UI, whereas it is assumed in the second to fifth embodiments that UI objects are automatically selected and arranged to generate a compound UI. However, in the second to fifth embodiment, it is also possible to perform the reduction processing by selecting UI objects as described in each embodiment when the user selects desired UI objects from a plurality of UIs to generate a compound UI but the desired UI objects cannot fit in the UI display area. Moreover, it is also possible to perform the UI re-compound processing accompanying change of the operation device, described in the first embodiment, in the second to fifth embodiments.

In addition, although the compound UI is generated with the UI objects composing a plurality of UIs in the above second to fifth embodiments, the present invention is also applicable to a case not to compound a plurality of UIs but to generate a single UI at a part of a predetermined UI display area by selecting multiple UI objects from the UI.

Moreover, although the UI definition file of the UI corresponding to each application is stored in the UI definition file memory area 52 in advance in the above embodiments, it is also possible to obtain a necessary UI definition file externally as necessary. In this case, if the UI definition file is specified from the application using the UI, it is determined whether the necessary UI definition file is stored in the UI definition file memory area 52 or the compound UI definition file memory are 56. If the necessary UI definition file is not stored in the UI definition file memory area 52 or the compound UI definition file memory are 56, the UI obtaining unit 12 of the control unit 10 obtains the necessary UI definition file from an external equipment or an external server (not shown) via the wireless communication unit 30.

Shown below is an exemplary file in the UIML form based on XML as an example of the UI definition file used in each of the above embodiments. In this example, the UI object is defined by <template> tag, and thus a description between <template> and </template> corresponds to the UI object definition information. Here, it shows an example of the UI object definition information of the UI objects "Power" and "Channel Selection +" from the UI definition file (TV1_interface.uiml) composing the TV remocon UI. Among underlined parts, priority attribute indicates priority order information (priority is higher as the value is closer to 0), relate attribute is the relationship information with other UI objects, and size attribute indicates the size information.

```
<template id = "t1_switch1" priority = "0">
    <part>
        <part class="G:Button" id="switch1"/>
    <style>
    <property name="image-src">TV_resorce_switch1.jpg</property>
    <property name="g:text">Power</property>
        <property name="g:size">30.30</property>
    </style>
    <behavior>
        <rule>
          <condition>
          <op name="and">
              <event class="KeyListener.g:keypressed"/>
              <op name="equal">
                  <property event-class="KeyListener.g:keypressed" name="keyCode" />
                  <constant value="57398" />
              </op>
          </op>
          </condition>
          <action>
              <call name="TVApp.on"/>
          </action>
          </rule>
```

```
        </behavior>
            </part>
</template>
<template id = "t1_select_up" priority = "1" relate_id="select 1">
        <part>
            <part class="G:Button" id="select_up"/>
        <style>
            <property name="image-src">TV_resorce_select_up.jpg</property>
            <property name="g:text">Channel Selection +</property>
            <property name="g:size">30.20</property>
        </style>
        <behavior>
            <rule>
                <condition>
                <op name="and">
                    <event class="KeyListener.g:keypressed"/>
                    <op name="equal">
                        <property event-class="KeyListener.g:keypressed" name="keyCode" />
                        <constant value="57399" />
                    </op>
                </op>
                </condition>
                <action>
                    <call name="TVApp.select_up"/>
                </action>
            </rule>
        </behavior>
            </part>
</template>
```

INDUSTRIAL APPLICABILITY

According to the present invention, even if a plurality of UI objects selected to compound a plurality of UIs cannot fit in the UI display area, the UI objects are reduced based on predetermined conditions and thus can fit in the UI display area. Accordingly, it is possible to fit the plurality of UI objects, which cannot fit in the predetermined UI display area by just a combination thereof, by reducing the UI objects. In addition, since it is prevented from reducing the UI object too much, it enables maintaining operability and visibility.

The invention claimed is:

1. A method for generating a user interface, the method comprising:
  generating a user interface:
  executing a predetermined function based on an application program, wherein the predetermined function includes remotely controlling an external device;
  displaying the user interface in a display area; and
  storing a plurality of user interface definition files and apparatus-dependent information, wherein:
  each user interface definition file includes user interface object definition information, the user interface object definition information defines an at least one user interface object,
  the user interface object is a component of the user interface, and
  the apparatus-dependent information indicating characteristics of the user interface generation apparatus, and including input device information,
  the input device information is information on an input device for operating the user interface object;
  selecting user interface objects,
  determining whether all of the selected user interface objects can be displayed in the display area based on the user interface object definition information;
  rewriting, when impossible to display, size information on a display size of the user interface object included in the user interface object definition information based on the apparatus-dependent information such that all of the selected user interface objects can be displayed; and
  generating a compound user interface based on the user interface object definition information with rewritten size information, the compound user interface including user interface objects from at least two different user interface definition files;
  setting a minimum value of the display size of the user interface object such that operability of the user interface object is maintained, based on a type of the user interface object, the user interface objection definition information and the apparatus-dependent information, and
  rewriting the size information with the minimum value as a lower limit.

2. The method for generating a user interface according to claim 1, further comprising setting the minimum value of the display size of the user interface object based on at least one of a minimum font size, a minimum line spacing and input device information, which are included in the apparatus-dependent information.

3. The method for generating a user interface according to claim 1, further comprising generating a selection screen for receiving selection of the user interface object based on the user interface object definition information,
  selecting the user interface object definition information to rewrite the size information based on a selection order of the user interface object selected on the selection screen and rewrites the size information of the selected user interface object definition information.

4. The method for generating a user interface according to claim 1, wherein the user interface object definition information includes priority order information indicating a priority order between user interface objects composing the user interface, and
  further comprising:
  selecting the user interface object definition information to rewrite the size information based on the priority order information and rewrites the size information of selected user interface object definition information.

5. The method for generating a user interface according to claim 1, further comprising selecting the user interface object definition information to rewrite the size information based on a ratio between the size information and the minimum value and rewrites the size information of the selected user interface object definition information.

6. A method for generating a user interface, the method comprising:
generating a user interface:
executing a predetermined function based on an application program, and
the predetermined function includes remotely controlling an external device;
displaying the user interface in a display area;
storing a plurality of user interface definition files and apparatus-dependent information,
each user interface definition file including user interface object definition information, the user interface object definition information defines an at least one user interface object,
the user interface object is a component of the user interface, and
the apparatus-dependent information indicating characteristics of the user interface generation apparatus, and including input device information, the input device information is information on an input device for operating the user interface object; and
generating a selection screen to select the user interface objects,
generating the selection screen based on the user interface object definition information included in the user interface definition file corresponding to each of the plurality of user interfaces, and
selecting user interface objects,
determining whether all of the selected user interface objects can be displayed based on a user interface display area and the user interface object definition information;
rewriting, when impossible to display, size information on a display size of the user interface object included in the user interface object definition information based on the apparatus-dependent information such that all of the selected user interface objects can be displayed; and
generating a compound user interface based on the user interface object definition information with rewritten size information, the compound user interface including user interface objects from at least two different user interface definition files,
setting a minimum value of the display size of the user interface object such that operability of the user interface object is maintained, based on a type of the user interface object, the user interface objection definition information and the apparatus-dependent information; and
rewriting the size information with the minimum value as a lower limit.

7. A method for generating a user interface, the method comprising:
generating the user interface:
executing a predetermined function based on the application program, wherein the predetermined function includes remotely controlling an external device;
displaying the user interface in a display area; and
storing a plurality of user interface definition files and apparatus-dependent information,
each user interface definition file including user interface object definition information, the user interface object definition information defines an at least one user interface object,
the user interface object is a component of the user interface, and
the apparatus-dependent information indicating characteristics of the user interface generation apparatus, and including input device information,
the input device information is information on an input device for operating the user interface object, wherein
the user interface object definition information includes, for an essential user interface object among user interface objects composing the user interface, essentiality information indicating that the user interface object is essential, and
determining whether all of the user interface objects can be displayed based on a user interface display area and the essentiality information;
rewriting, when impossible to display, size information on a display size of the user interface object included in the essential user interface object definition information such that all of the essential user interface objects can be displayed; and
generating a compound user interface based on the user interface object definition information with rewritten size information, the compound user interface including user interface objects from at least two different user interface definition files,
setting a minimum value of the display size of the user interface object such that operability of the user interface object is maintained, based on a type of the user interface object, the user interface objection definition information and the apparatus-dependent information; and
rewriting the size information with the minimum value as a lower limit.

8. The method for generating a user interface according to claim 1, further comprising:
executing a predetermined function based on the application program;
determining an operation input device; and
rewriting the apparatus-dependent information in accordance with the operation input device.

9. The method for generating a user interface according to claim 8, wherein, when change of the operation input device is detected while the compound user interface is displayed, rewriting the apparatus-dependent information in accordance with the changed operation input device, and generating a new compound user interface based on the apparatus-dependent information rewritten.

10. The method for generating a user interface according to claim 1, further comprising:
generating a selection screen for receiving selection of the user interface object based on the user interface object definition information;
selecting the user interface object definition information to rewrite the size information based on a selection order of the user interface object selected on the selection screen; and
rewriting the size information of the selected user interface object definition information.

11. The method for generating a user interface according to claim 2, further comprising:
generating a selection screen for receiving selection of the user interface object based on the user interface object definition information;

selecting the user interface object definition information to rewrite the size information based on a selection order of the user interface object selected on the selection screen; and rewriting the size information of the selected user interface object definition information.

12. The method for generating a user interface according to claim 1, wherein the user interface object definition information includes priority order information indicating a priority order between user interface objects composing the user interface, and further comprising:

selecting the user interface object definition information to rewrite the size information based on the priority order information; and rewriting the size information of selected user interface object definition information.

13. The method for generating a user interface according to claim 2, wherein the user interface object definition information includes priority order information indicating a priority order between user interface objects composing the user interface, and further comprising:

selecting the user interface object definition information to rewrite the size information based on the priority order information; and rewriting the size information of selected user interface object definition information.

14. The method for generating a user interface according to claim 2, further comprising:

selecting the user interface object definition information to rewrite the size information based on a ratio between the size information and the minimum value; and rewriting the size information of the selected user interface object definition information.

15. The method for generating a user interface according to claim 6, further comprising:

receiving input, via the user interface, for executing a predetermined function based on the application program; and determining an operation input device; and rewriting the apparatus-dependent information in accordance with the operation input device.

16. The method for generating a user interface according to claim 7, further comprising:

receiving input, via the user interface, for executing a predetermined function based on the application program; and determining an operation input device; and rewriting the apparatus-dependent information in accordance with the operation input device.

\* \* \* \* \*